(12) United States Patent
Huang et al.

(10) Patent No.: US 7,871,570 B2
(45) Date of Patent: Jan. 18, 2011

(54) FLUIDIC ARRAY DEVICES AND SYSTEMS, AND RELATED METHODS OF USE AND MANUFACTURING

(76) Inventors: Joseph Zhili Huang, 2004 Aspen Dr., Plainsboro, NJ (US) 08536; Yong Shi, 8 Yale St., Nutley, NJ (US) 07110; Yufeng Ma, 231 Harrison Ave., 3rd Floor, Harrison, NJ (US) 07029

( * ) Notice: Subject to any disclaimer, the term of this patent is extended or adjusted under 35 U.S.C. 154(b) by 195 days.

(21) Appl. No.: 12/070,960

(22) Filed: Feb. 22, 2008

(65) Prior Publication Data
US 2008/0206101 A1    Aug. 28, 2008

Related U.S. Application Data

(60) Provisional application No. 60/971,886, filed on Sep. 12, 2007, provisional application No. 60/891,347, filed on Feb. 23, 2007.

(51) Int. Cl.
*B01L 9/00* (2006.01)
(52) U.S. Cl. .................. 422/68.1; 422/99; 422/100; 422/103; 422/104; 137/487.5; 436/43; 436/174; 436/180
(58) Field of Classification Search ............... 422/68.1, 422/99, 100, 102, 104; 436/43, 174, 180; 137/487.5
See application file for complete search history.

(56) References Cited

U.S. PATENT DOCUMENTS

| | | | |
|---|---|---|---|
| 5,919,548 A | 7/1999 | Barron et al. | |
| 5,932,799 A | 8/1999 | Moles | |
| 6,103,199 A | 8/2000 | Bjornson et al. | |
| 6,162,838 A | 12/2000 | Kohl | |
| 6,319,469 B1 | 11/2001 | Mian et al. | |
| 6,408,878 B2 | 6/2002 | Unger et al. | |
| 6,485,690 B1 | 11/2002 | Pfost et al. | |
| 6,508,988 B1 | 1/2003 | Van Dam et al. | |
| 6,595,630 B2 | 7/2003 | Jagannathan et al. | |
| 6,597,090 B1 | 7/2003 | Mancevski | |
| 6,626,417 B2 | 9/2003 | Winger et al. | |
| 7,046,357 B2 * | 5/2006 | Weinberger et al. | 356/246 |
| 7,135,147 B2 | 11/2006 | Cox et al. | |
| 7,438,856 B2 * | 10/2008 | Jedrzejewski et al. | 422/100 |
| 2002/0155515 A1 | 10/2002 | Farina et al. | |
| 2004/0248318 A1 * | 12/2004 | Weinberger et al. | 422/68.1 |
| 2005/0145279 A1 * | 7/2005 | Pinter et al. | 137/487.5 |
| 2005/0196321 A1 | 9/2005 | Huang | |
| 2007/0275193 A1 | 11/2007 | DeSimone et al. | |

OTHER PUBLICATIONS

International Search Report and Written Opinion for PCT/US09/33621.

* cited by examiner

*Primary Examiner*—Jill Warden
*Assistant Examiner*—Sharon Pregler

(57) ABSTRACT

The instant application provides a fluidic array device having an elastomeric body that provides easy fluidic control of the device. The elastomeric body may include plurality of intersecting row and column channels. Reactions may occur at the intersection spots formed by the intersecting channels. Pinching applied at suitable locations along the channels enables the channels to be opened or closed, and thus provides control of fluids pumped through the device. The surfaces of the channels and intersection spots may be engineered to have certain properties. In particular, the intersection spots may be nanoengineered to have surface properties differing from those of the channels, and thus reactions may be selectively controlled to occur only, or highly preferentially, in the intersection spots.

6 Claims, 27 Drawing Sheets

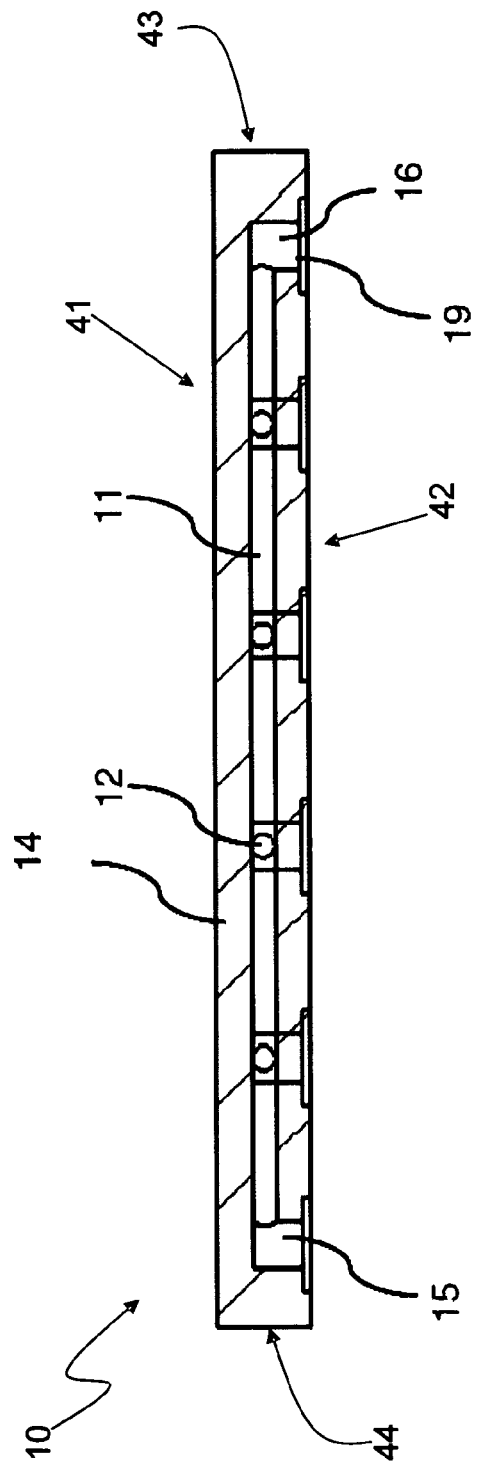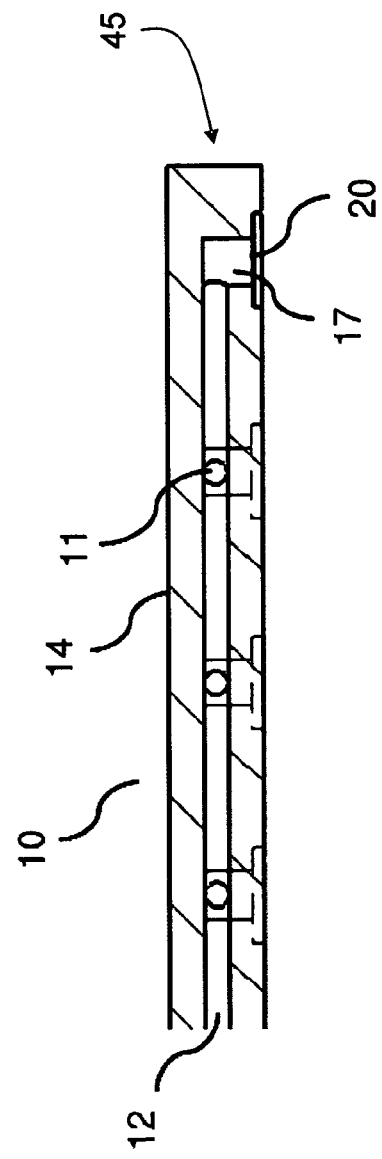
Fig. 2
Fig. 3

FLUIDIC ARRAY DEVICES AND SYSTEMS, AND RELATED METHODS OF USE AND MANUFACTURING

CROSS-REFERENCE TO RELATED APPLICATIONS

This application claims the benefit of U.S. Provisional Patent Application No. 60/971,886, filed on Sep. 12, 2007 and of U.S. Provisional Patent Application No. 60/891,347, filed on Feb. 23, 2007, both of which are incorporated herein by reference.

FIELD OF THE INVENTION

This invention relates to fluidic array devices and instruments with channels and fluidic interfaces, controls of fluid flow within the channels in the device, methods for chemistry or biochemistry probe coupling and reactions, and applications in chemistry and biochemistry, and clinical diagnosis. This invention also relates to fluidic array devices with nanoengineered channel surfaces, and/or embedded materials to immobilize DNA, proteins, cells, and/or other chemicals or molecules for biochemical or biological analysis, and methods for making such devices.

BACKGROUND OF THE INVENTION

Microarray Biochip technologies have become central platforms for biological research. The study of gene expression, single nucleotide polymorphism (SNP), comparative genome hybridization (CGH), and protein profiling expression by microarray biochip assays have become standard research techniques. Microarray studies have found a role in both basic and applied research and have also been used in drug discovery, biomarker selection, toxicogenomics, pharmacology, and development of diagnostic and prognostic tests. More recently, microarray-based biochip assays have found a role in clinical diagnostic applications.

Currently, there are major drawbacks with microarray technologies. Despite the fact that microarray technologies have been widely applied over the years and are now considered mature, concerns linger about the consistency and reproducibility of the data from multiple tests. Many investigators are reporting that gene expression data by microarrays is different from other traditional techniques. In addition, debates exist as to whether data from the two different platforms, in situ arrays and spotted arrays, can be compared.

Current processes for manufacturing both array platforms fail to allow for cost-effective customization. Each spot on a microarray requires a discrete deposition or synthesis, both of which are subject to process variation and product control issues that add to the expense and time required for completion. Although microarray and/or alternative approaches permit the measurement of tens of thousands of biological probes simultaneously, they can test only one biological sample at time. This feature is ideal for genome-wide expression profiling, or SNP or protein screening, but is not ideal for applications where a limited number of genes or proteins will be examined for diagnostic purposes, and where testing multiple clinical samples at the same time is preferred. In such a situation, the ability to measure multiple biological samples or duplicate samples simultaneously will increase efficiency, accuracy, and throughput.

Microfluidic technologies are some of the fastest growing sectors in combinative and analytic chemistry, medical devices, and biology. Direct applications can be found in the fields of pharmaceutical development, food testing, clinical diagnostics, forensics, and environmental analysis. Moreover, as these devices are being developed into miniature analyzers (smaller versions of analytical instrumentation), the number of applications is rapidly expanding as the technology advances.

Most microfluidic devices are fabricated with silicon and glass using photolithography, etching, and bonding. These methods are adopted from conventional fabrication techniques used in the semiconductor industry. More recently, hot embossing has been used for complex microfabricated structures.

In microfluidics, traditional materials, such as silicon and glass, are not always the best choice. Also, for some applications, truly three dimensional structures are desired, especially those that possess arbitrary surface height profiles, such as fluidic interfaces. Realization of such structures generally requires multiple lithographic masking and etching, alignment and bonding steps, which add significant process complexity and have implications on reproducibility and yield. Current methods, though highly developed, have some limitations and disadvantages for fluidic device fabrication and construction. Varying depths within the structure on a single wafer is not possible in single step processing, that is, 3D microstructures with high-aspect-ratios are very difficult to achieve. These methods are expensive, as they require clean room processing; photolithographic, etching, and bonding procedures; as well as a silicon, glass, or quartz wafer materials. Consequently, unit costs of microfluidic devices are very high.

In these current microfabrication methods, bonding is an unavoidable processing step that is costly and prone to imperfections. A common drawback with bonding is incomplete bonding of the various areas and regions, which causes microchannel, microchamber, or cavity imperfections, as well as cross leakage. As microstructures become more and more complex, such incomplete bonding becomes an increasingly unwieldy problem.

Assembly of carbon nanotubes from as-grown randomly tangled states into well-ordered arrays has attracted considerable attention from researchers and engineers worldwide due to specific properties of the carbon nanotubes and its importance for chemical, biomedical and engineering applications. Many researches have recently demonstrated the preparation of organized nanotube arrays using effective methods such as wet chemical self-assembly and capillary force induced alignment. For the many applications, well-ordered and functionalized carbon nanotubes are greatly desirable. However, it remains a big challenge and is still at the prototype level.

Accordingly, there is a need for the development of improved fluidic array devices and related methods of manufacturing thereto.

SUMMARY

Various embodiments fill the foregoing need by providing such devices and technology. In one aspect, various embodiments provide fluidic array devices with structures and methods for on-chip flow control, flexible probe configurations, and dynamic chemical or biochemical reactions. Certain embodiments set forth a fluidic array device having an elastomeric body, intersected fluidic channels, and fluidic interfaces.

Other embodiments may include one or more of the following features described generally in the following. A fluidic device may have an elastomeric body and a retaining frame. The elastomeric body may be initially formed from a liquid elastomeric material, such as polydimethylsiloxane (PDMS), from an elastomer, or from silicone rubber. Within the body may be disposed two or more fluidic channels, and an intersection spot formed by two or more fluidic channels. Each fluidic channel may have a fluidic interface at each end of the fluidic channel. The fluidic channels may be of any shape, such as rounded, square, or other otherwise, and may have dimensions ranging, for example, from millimeters to micrometers in size. The fluidic interfaces may be disposed on any surface of the device, such as on a top or bottom surface, or on any side surfaces of the device. The intersection spot may have dimensions that are the same as a fluidic channel, or which may be larger or smaller than that of the fluidic channel. The retaining frame may hold the elastomeric body.

In a further embodiments, a fluidic device may have more than two fluidic channels to form more than one intersection spot, the intersection spots and fluidic channels thus forming a fluidic array device.

Certain embodiment fluidic devices may have a body made from one elastomeric part and one rigid part. The elastomeric part of the body may be made from a liquid polymer material, such as polydimethylsiloxane (PDMS), from an elastomer, or from silicone rubber. The rigid part of the body may be plastic, glass, silicon, quartz, or any other transparent material. On the elastomeric part of the body, grooves and holes may be formed by, for example, liquid polymer molding, and the elastomeric and rigid parts may then be bonded together to form fluidic channels, fluidic interfaces, and intersection spots in the fluidic device. A retaining frame may be disposed around the elastomeric part of the body. In certain embodiments, the retaining frame may be made with the rigid part of the body to form an enclosure for the fluidic device. Various embodiments include at least two fluidic channels that intersect to form at least one intersection spot. The fluidic channels may have any suitable shape, such as rounded, square, or other otherwise, with dimensions from millimeter to micrometer. Fluidic interfaces may be disposed at both ends of each fluidic channel. The fluidic interfaces may be disposed on any surface of the device, such as the bottom of the device, the top of the device, or on lateral sidewall surfaces of the device.

In further embodiments, the array device may comprise more than two fluidic channels to form more than one intersection spots, the plurality of intersection spots and fluidic channels thus forming a fluidic array device.

A specific embodiment of a mount for an embodiment fluidic device includes a stage, fluidic pins, and a clamping plate. The stage may include framing corners, through holes, and ridges. The framing corners may be used to align the fluidic device upon the stage. In preferred embodiments, the respective distances between the framing corners are the same as the outside dimensions of the retaining frame in the fluidic device. In alternative embodiments, the retaining frame may include alignment holes or pins that correspond to respective seating pins or holes on the stage. Through holes in the stage may correspond to the fluidic interfaces on the fluidic device. The fluidic pins may be disposed through these through holes to mate with the fluidic interfaces of the fluidic device. The fluidic pins thus realize fluidic connections between the mount and the fluidic device. Ridges on the stage may be disposed between the through holes, or between the through holes and the respective fluidic interfaces on the fluidic device. The ridges are used to block respective fluidic channels in the fluidic device, and so the height of each ridge from the top surface of the stage may be just high enough to pinch the respective fluidic channel.

In preferred embodiments, the ridges are formed on the stage as humps. However, the ridges may also be mechanically activated, such as by a linear actuator that moves a respective ridge up and down to close and open the corresponding fluidic channel in the fluidic device. Any suitable actuator may be used to realize the resulting pinching function, such as a piezoelectric motion component, a magnetostrictive component, a shape memory alloy, a pneumatic actuator, a solenoid, or the like.

In general, in another aspect, embodiment fluidic devices may include an elastomeric body, fluidic channels, an intersection spot, and fluidic interfaces for molecular probe configurations, and dynamic chemical or biochemical reactions.

Embodiments may include one or more of the following features discussed in the following. An embodiment fluidic device may include an elastomeric body with fluidic channels and an intersection spot, as discussed above. The surface of a fluidic channel may be changed from hydrophobic to hydrophilic for molecular probe coupling, such as by employing a suitable chemical process. The surface property of a fluidic channel may also be made hydrophilic or hydrophobic using, for example, a fabrication process. Because specific embodiment fluidic devices are made from liquid polymer molding, the surface of a mold component can be treated to a mirror-like finish for a hydrophobic surface, or textured with a certain roughness for a hydrophilic surface, and hence the surface of a fluidic channel made from the mold component may be hydrophobic or hydrophilic according to the corresponding surface of the mold component. The mold component may also be made to have a certain surface texture within the area of the intersection spot and to have a mirror-like texture on other areas, thus causing the surface at the intersection spot of the fluidic device to be hydrophilic while the fluidic channels are hydrophobic.

In various embodiments, the surface of one or more fluidic channels may be created to have nanostructures. For example, a nanostructured fluidic channel may be made super-hydrophobic by providing lotus-leaf-like nanonubs on a surface of the fluidic channel. The surface at the intersection spot may be created with nanofeatures that differ from the surface of the fluidic channel(s). Therefore, molecules may be captured on the surface at the intersection spot and scarcely or not at all on the surfaces of the fluidic channels.

In some embodiments, the surface at the intersection spot may be created with nanostructures that increase the surface area by thousands of times to that of the surfaces of the fluidic channels. Molecules used as probes for analysis or diagnosis may bind much more readily to the surface at the intersection spot than on the surfaces of the fluidic channels. The signal level for detection may thus be much higher. In further embodiments, the surface at the intersection spot may be created with nanostructures that capture or immobilize cells, while the surfaces of the fluidic channels may be formed to be super-hydrophobic so that few, if any, cells or other biomolecules bind to the fluidic channel surfaces. Cell culturing and other cell analysis can thus take place at the intersection spot.

In specific embodiments, the intersection spot may include columns of any shape, such as round, diamond, or square, but which are not limited to regular shapes. The dimensions of the columns or the number of columns in the intersection spot can be made according to the size of the molecules to be analyzed, and according to the application requirements. In some embodiments, the columns are formed integrally with the elastomeric body. In other embodiments, the columns may be bonded to the elastomeric body. In specific embodiments, the columns may be nanotubes, such as carbon nanotubes.

In another aspect, embodiment fluidic array devices may include an elastomeric body having intersected fluidic channels, an embedded substrate at the intersection spot of the fluidic channels, and fluidic interfaces. Specific embodiments may include one or more of the following features: the substrate may be made from a plain silicon wafer, a silicon wafer with a nanoengineered surface, a permanent magnet, a polymer such as polycarbonate or polystyrene, a nylon membrane, gold, or other sheet material with a thickness of, for example, 500 to 1 micron. In further embodiments, DNA, RNA, proteins, or cells may be immobilized on the surface of the substrate to serve as a probe to sense other genetic material or proteins in a sample.

In certain specific embodiments, the substrate may be made from a magnetic material, which may be a permanent magnetic material. Magnetic beads with probe DNA, RNA, probe antigens, cells or the like attached thereto are injected into a channel while the intersected channel is closed by pinching the elastomeric body at the both sides of the substrate. The probes attached to magnetic beads are affixed to the surface of the substrate by magnetic force, or in other embodiments by an electromagnetic force that may permit used probes to be flushed away and the substrate to be re-used. While switching the fluidic channels, a sample solution may be injected into the channel. Biochemical or biological reactions, such DNA hybridization or protein specific reactions between the probe-attached magnetic beads and molecules in the sample will take place. Results may then be detected by, for example, laser induced fluorescence detection or electrochemical detection.

In other embodiments, more than two fluidic channels may be inlets to an intersection spot, and thus more than two fluidic channels may intersect at a corresponding intersection spot. In specific embodiments, each fluidic inlet of an intersection spot may be individually controlled by respective ridges on the stage, which may be mechanically activated.

Embodiment fluidic devices may be configured by the number of targets to be interrogated or by the number of samples to be analyzed. An embodiment assay may be based upon independent yes/no answers at each intersection spot that respectively indicate the presence or absence of each selected target.

In another aspect, various embodiments provide a mold assembly device for making an embodiment fluidic array device. The mold device may include a top mold, a bottom mold, side molds, and a sacrificial mold. A cavity is formed by the assembly of the molds. A liquid polymer may be injected into the cavity. When the liquid polymer cures, it is released from the mold assembly device, and a body for a fluidic device with the sacrificial mold embedded therein is created. The sacrificial mold may be dissolved in a solvent, such as water or a mildly acidic solution. Structures complementary to the sacrificial mold are created in the body of the fluidic device.

In further embodiments, the sacrificial mold can be made from a soluble material, such as soluble polymer, or soluble plastics. Further, the surface of the sacrificial mold can be featured with nanostructures that can be transferred to the surface of the body of the fluidic device as complementary structures.

In certain specific embodiments, droplets of a functionalized nanotube solution may be deposited or sprayed onto the surface of the sacrificial mold substrate. A liquid polymer, such as a mixture of a precursor and its curing agent, may be poured into the mold with the sacrificial mold and left to cure. After the liquid polymer cures, the sacrificial mold component and the cured liquid polymer are demolded. The sacrificial mold component is then dissolved in a solvent, such as water and a slightly acid solution. The functionalized nanotubes are entrapped in the cured liquid polymer.

Advantages of embodiment fluidic array devices include flexibility and customization of the array devices. With sophisticated fluidic channels, intersection spots, and the fluidic interface, probe immobilization and configurations for the spots can be performed easily. For example, cystic fibrosis is one of the most common autosomal-recessive disorders, affecting one in 2500 births in the Caucasian population. Although over 1000 mutations have been identified that cause cystic fibrosis, only 25 have been generally recommended for carrier screening. But for different racial groups, the recommended mutations may be somewhat different. With embodiment fluidic array devices, the mutations detected for different racial groups can be easily configured in the array device. As new target variations arise, assays for them can be rapidly integrated into the fluidic array device.

A further advantage of various embodiments is that all liquid manipulations may occur inside the fluidic device. Probe coupling and target delivery may be done within the fluidic channels, which eliminates possible contamination and reduces requirements upon the operational environment, such as temperature, humidity, and airborne particulates. Failures resulting from human intervention are reduced to a minimum. Environmental contaminants may be completely eliminated.

Yet another advantage provided by certain embodiments is parallel detection of different samples and controls simultaneously with the same or different molecular probes under identical conditions. For example, in gene screening analysis, it is common that mutant-type, wild-type, and negative control samples are detected. With an embodiment fluidic array device, the same type of probes can be immobilized at the intersection spots, as provided by the fluidic interfaces, along the probe fluidic channel; and different samples and controls can be loaded into the different sample channels, and reacted with the probes along the sample channel. The reaction of the different samples and controls can be performed simultaneously under the same conditions. Target analysis on the same device at the same time makes sample comparisons and quality control issues easier.

A further advantage lies with dynamic reactions in the channels. For example, currently, microarray chips have been widely used for DNA analysis and disease diagnosis. Various cDNA or oligonucleotide probes are synthesized or spotted on a solid substrate. Only the complementary probes react with specific DNA sample fragments coordinated with the probes. But the size of the probe spots is, for example, about 0.2 mm in diameter, and the DNA sample is dropped onto the substrate to cover the entire area. The concentration of the target DNA fragments is required to be sufficiently great to cause a hybridization reaction between the target DNA fragments and the complementary probes to occur in this area that is but 0.2 mm in diameter, otherwise the target DNA fragments may fail to match the complementary probes. This requirement makes sample usage efficiencies very low and the reproducibility of the analysis and diagnosis poor in current microarray technologies. In various embodiment devices, the intersection spot can be modified to be hydrophilic while the fluidic channel is made hydrophobic. The molecular probe couples only to the surface of the intersection spot. During a hybridization reaction, the target DNA sample is propelled forward and backward along the fluidic channel at a certain flow rate. Because of this sample solution movement, each specific DNA fragment will find a complementary DNA probe at the intersection spot along the channel. With such dynamic reactions, the requirements for large amounts and high concentrations of a sample are eliminated, and the detection sensitivity and accuracy are increased. Consequently, reproducibility and the efficiencies are significantly increased.

Another advantage of specific embodiments is that columns can be disposed inside the intersection spot, and on the surfaces of the columns nanomaterials can be embedded, so that the net surface area of the intersection spot is increased, resulting in increased probe coupling efficiencies and probe and target reaction efficiencies.

A further advantage provided by various embodiment fluidic array devices is the flexibility and customization of the array devices.

Other features, objects, and advantages will be apparent from the description and drawings, and from the claims.

BRIEF DESCRIPTION OF THE DRAWINGS

FIG. 2 is a sectional view of the array device along a plan 1 shown in FIG. 1.

FIG. 3 is a sectional view of the array device along a plan 2 in FIG. 1.

DETAILED DESCRIPTION

Definitions

The term "intersection spot" as used herein refers to a cavity at an intersection of two or more fluidic channels. Dimensions of the intersection spot may be smaller, larger or equal to those of the related fluidic channels, and may range from millimeters to nanometers.

The term "array device" as used herein refers to a device having at least one intersection spot, and preferably a plurality of intersection spots, which are typically, but not necessarily, formed as an array.

The terms "bonding," "coupling," or "couple" as used herein means attachment, such as of a chemical or biological entity, to a surface by any means. The attachment may be, for example, by covalent or non-covalent bonds, absorption, magnetic attraction, embedding, etc.

The term "fluidic array device" as used herein refers to a device in which a plurality of channels are arranged in a predetermined pattern, such as a grid. The channels intersect to form at least one intersection spot, and typically a plurality of intersection spots, thus forming an array device. The intersection spots can be used as a unit for configuration with different chemical or biochemical materials by way of the fluidic channels, and support chemical or biochemical reactions within the intersection spots.

The term "elastomeric material" as used herein refers to a material having elastic properties such as found in, for example, natural rubber. An elastomeric material may be formed, as by molding, in a curable liquid state by mixing together a liquid base and a curing agent at a certain ratio. After solidification, the elastomeric material may form a structure having features that accurately reproduce features of the device mold and mold components. Other properties of an elastomeric material may include good thermal stability, the ability to repel water and form watertight seals, and flexibility. Examples of elastomeric materials used herein include, but are not limited to, polydimethylsiloxane (PDMS), liquid silicone rubber, room temperature vulcanizing (RTV) rubber, polymeric rubber, and elastoplastic.

A nanostructure is a material structure created or assembled from a layer or cluster of intermediate sizes that are between molecular and micrometers in size.

EXAMPLE EMBODIMENTS

Figure 1:
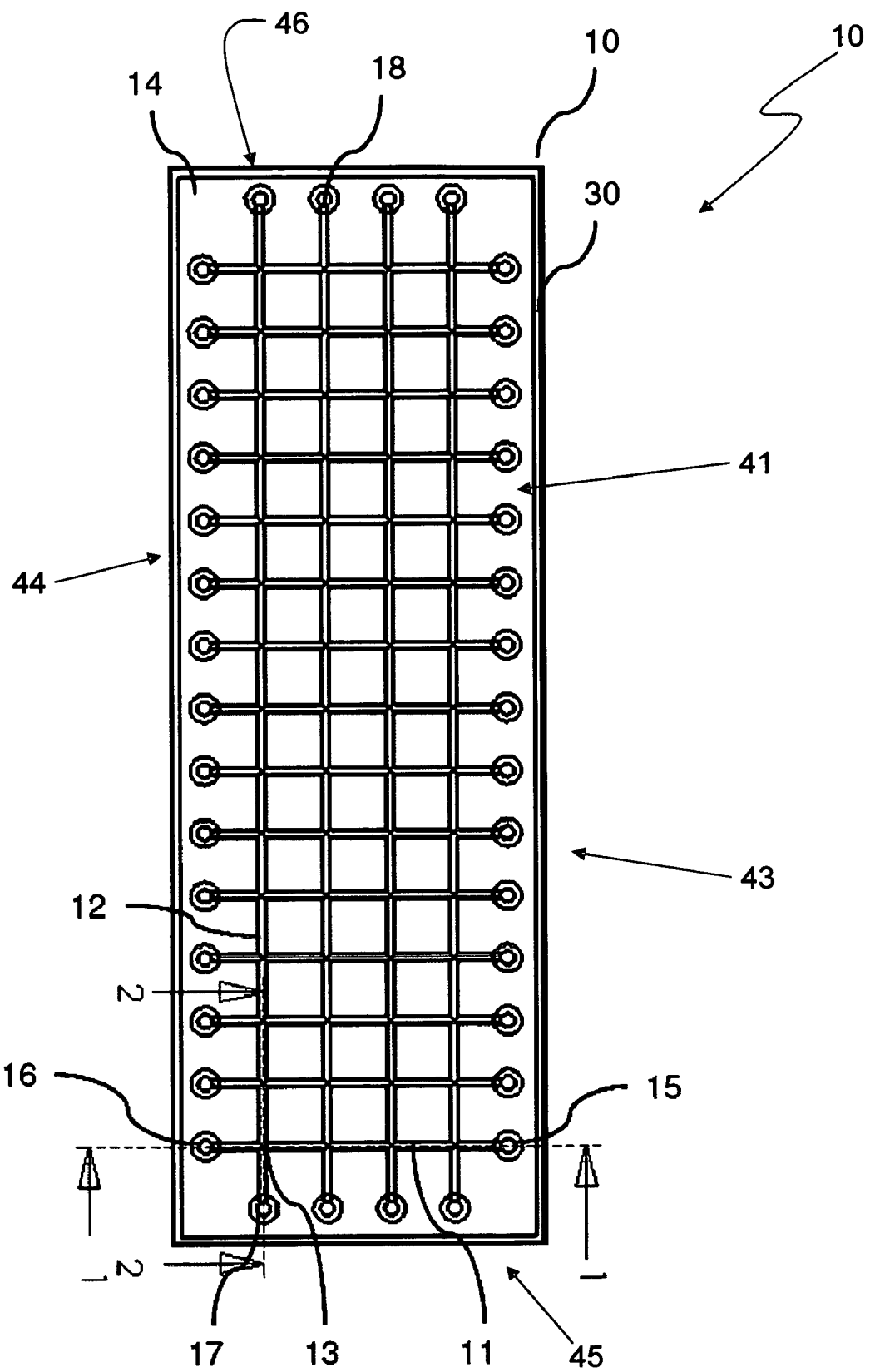
FIG. 1 is a top view of an embodiment fluidic array device having fluidic channels, a retaining frame, and fluidic interfaces.

Various embodiments provide fluidic array devices, which may be used for chemical and biochemical analysis. FIG. 1 shows a top view of an embodiment fluidic array device 10 with a 4 15 array of intersection spots 13. FIG. 2 shows a sectional view of the array device 10 along a plan 1 indicated in FIG. 1. FIG. 3 shows another sectional view along a plan 2 indicated in FIG. 1.

The fluidic array device 10 includes a body 14. Inside the body 14 are four column fluidic channels 12 with fluidic interfaces 17 and 18, and fifteen row fluidic channels 11 with fluidic interfaces 15 and 16, which together form the 4 by 15 array of intersection spots 13 by respective intersections of column fluidic channels 12 with row fluidic channels 11. The body 14 of the device 10 may be made of an elastomeric material by any suitable molding process, such as by a molding process disclosed in U.S. Pat. No. 7,125,510 to Zhili Huang, entitled "Microstructure Fabrication and Microsystem Integration," the contents of which are incorporated herein by reference. A retaining frame 30 may be disposed external to the elastomeric body 14 to support and/or retain the shape of the elastomeric body 14. The sidewall surfaces of the channels 11, 12 may be coated with a material, such as poly-L-lysine, aminosilane, or aldehyde, to assist, for example, in the coupling of chemicals or molecules to the sidewall surfaces.

The fluidic interfaces 15-18 can be on the top side 41 of the device 10, the bottom side 42 of the device 10 as shown in FIGS. 2 and 3, or on the four sidewalls 43-46 of the device 10. The fluidic interfaces 15-18 may provide wells or reservoirs for a fluid, as well as fluidly connecting to a corresponding fluidic channel 11, 12. If the fluidic interfaces 15-18 are on the sidewalls 43-46 of the device 10, the wells may actually be a part of the respective fluidic channels 11, 12. A recess 19, 20 may be provided at each fluidic interface 15-18 for sealing purposes. Although the device 10 has 60 intersection spots 13, it will be understood that other numbers of intersection spots 13 are possible, as well as other numbers and arrangements of fluidic channels 11, 12. The fluidic channels 11, 12 as shown in FIGS. 2 and 3 may be round in shape with respective diameters on the order of, for example, micrometers, but other configurations are possible. For example, the channels can be square or rectangular, as shown by channels 104, 105 in FIG. 4.

In particular embodiments, the dimensions of the device 10 may be compatible with those of microscope slides that are used in current spotted arrays. Alternatively, the dimensions of the device 10 may be compatible with those of an Affymetrix Genechip, or any other desirable size. The device 10 may have as little as one column fluidic channel 12 and one row fluidic channel 11; the maximum number of fluidic channels 11, 12 is limited only by the distance between the fluidic channels, the sizes of the fluidic channels 11, 12, and the size of the device 10, and can include thousands of such channels 11, 12.

Figure 4:
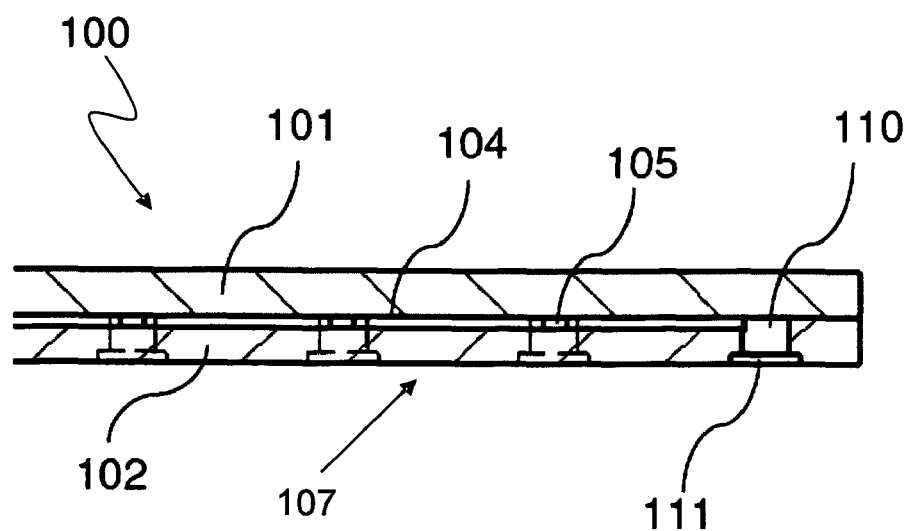
FIG. 4 is a sectional view of a portion of an embodiment array device.

FIG. 4 shows a sectional view of another fluidic array device 100 with a fluidic configuration similar to the device 10 along a sectional line as indicated in plan 2 of FIG. 1. The device 100 includes two materials 101 and 102. Material 101 may be a rigid and transparent material, such as glass, a silicon substrate, quartz, or the like. Material 102 may be an elastomeric material, such as polydimethylsiloxane (PDMS), liquid silicone rubber, room temperature vulcanizing (RTV) rubber, polymeric rubber, elastoplastic, etc. Grooves and holes, formed, for example, by molding, are present in the material 102, as described, for example, in the above-mentioned U.S. Pat. No. 7,125,510. Channels 104 and 105, and fluidic interfaces 110, are formed by placing the two materials 101 and 102 together. The embodiment channels 104 and 105 are shown with a square shape, but other shapes are certainly possible, such as half rounded, elliptical, or the like. The fluidic interfaces 110 as shown in FIG. 4 are disposed on the bottom side 107 of the device 100, but could also be disposed, for example, on the sidewalls of the device 100. A recess 111 can be formed in each fluidic interface 110 for sealing purposes.

Figure 5:
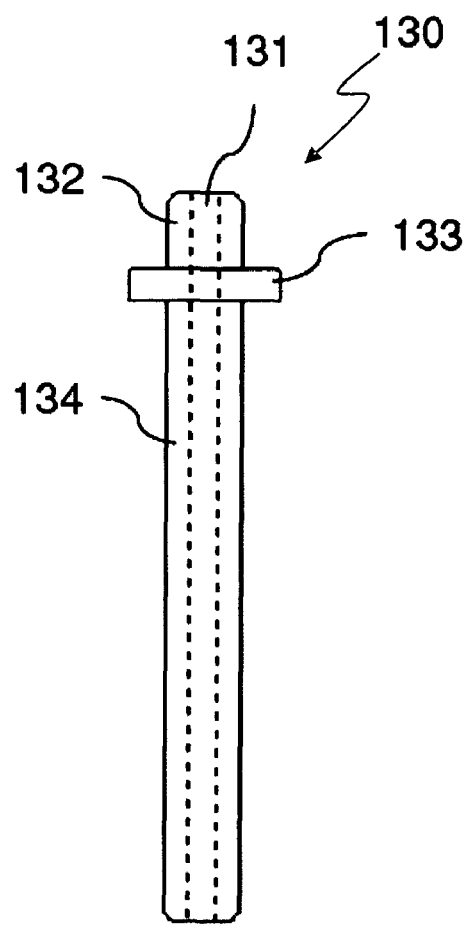
FIG. 5 is a side view of a fluidic pin used as a fluidic connection for an embodiment fluidic array device.

FIG. 5 shows a fluidic pin 130. Pin 130 includes a tubing 131 and may also include a flange 133. When a fluidic device, such as the devices 10, 100, is mechanically coupled to a pin 130, the top part 132 of the tubing 131 is inserted into a corresponding fluidic interface 15-18, 110 to form a fluidic connection with the device 10, 100. The flange 133 may plug the recess 19, 20, 111 of the fluidic interface 15-18, 110 to form a watertight seal.

Figure 6:
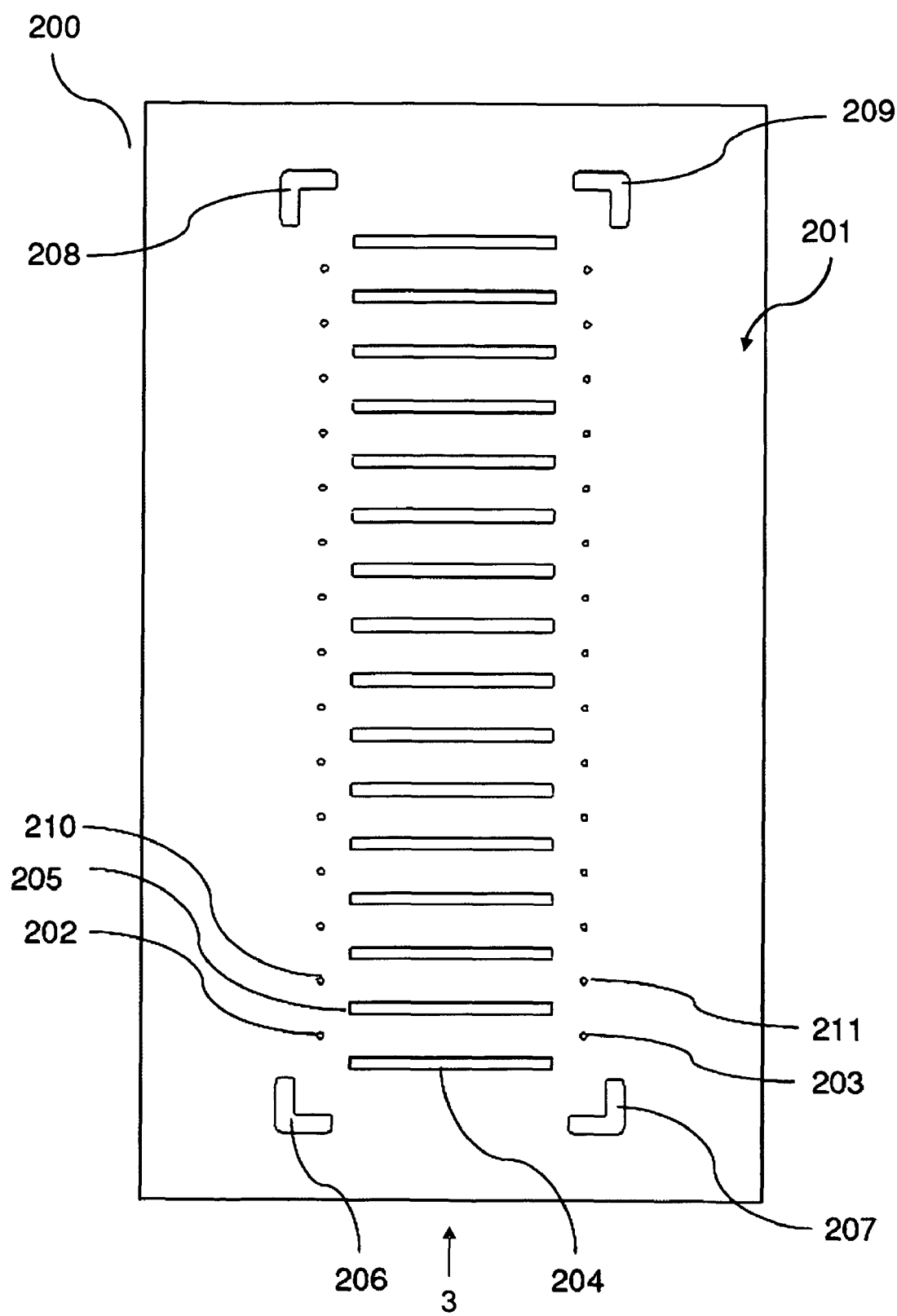
FIG. 6 is a top view of an embodiment stage used to block fluidic channels in columns on an embodiment fluidic array device.

FIG. 6 shows a top view of an embodiment stage 200 that may be used to block column fluidic channels in an embodiment fluidic array device, such as the devices 10 and 100. On the top 201 of the stage 200 are disposed four framing corners 206, 207, 208, and 209. The top surface 201 may also include one or more ridges, two of which are marked as 204 and 205. In preferred embodiments, the number of ridges 204, 205 may equal or exceed by one the number of row fluidic channels in the fluidic device that the stage 200 is adapted to accept. Simply by changing the stage 200 with different numbers and positions of ridges 204, 205, the stage 200 can be made to accommodate different sizes of the fluidic array devices. The top surface 201 may further include two columns of through holes 202, 203, 210, 211, each column disposed along a corresponding side of the ridges 204, 205. The four framing corners 206-209 are used to align a fluidic array device 10, 100 on the stage 200 when disposed on the stage 200. The ridges 204, 205 are designed to be of a sufficient height to block or pinch the column fluidic channels, such as the channels 12 in the device 10 when the device 10 is clamped onto the top surface 201 of the stage 200. The through holes 202, 203, 210, 211 correspond to respective fluidic interfaces, such as the fluidic interface 15-18 in the fluidic device 10.

Figure 7:
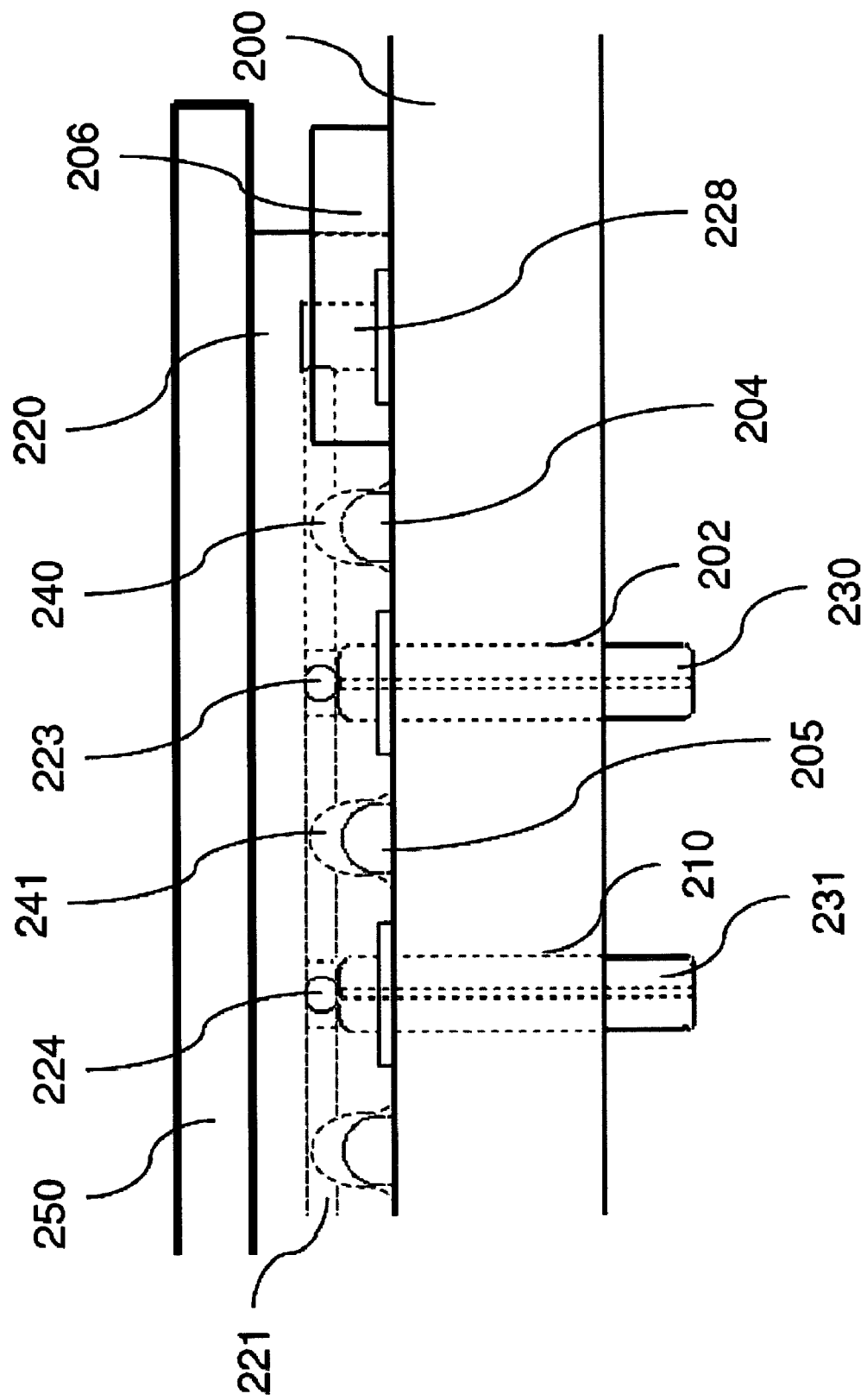
FIG. 7 is a side view of a portion of the fluidic stage shown in FIG. 6 with an assembly of fluidic pins, a fluidic array device, and a ridge clamping plate.

FIG. 7 is a side view of a portion of the stage 200 shown in FIG. 6 from direction 3 further including fluidic pins 230, 231, and a clamping plate 250. A fluidic array device 220 is disposed on the top surface 201 of the stage 200. The framing corner 206, together with the three other framing corners 207-209, align the fluidic array device 220 on the stage 200. The device 220 may, for purposes of this example, be similar to the fluidic device 10, having fluidic channels 221, 223 as described with regards to the fluidic channels 12, 11 in the device 10. The fluidic pins 230, 231 may be configured like the fluidic pin 130 shown in FIG. 5, and are disposed through the through holes 202, 203, 210, 211 to plug into the recesses and fluidic interfaces of the device 220. The plate 250 may be a rigid plate that clamps onto the top of the fluidic device 220. Because the device 220 is made from an elastomeric material, once it is clamped onto the stage 200 by way of the plate 250, the column fluidic channels 221 are blocked, as shown at positions 240 and 241, by the ridges 204, 205 on the top 201 of the stage 200. The row fluidic channel 223, for example, is thus fluidly isolated from the column fluidic interfaces 228 by the ridge 204 at position 240, and is further isolated from the adjacent row fluidic channel 224 by the ridge 205 at position 241. In a similar manner, each row fluidic channel may be selectively fluidly isolated from other row fluidic channels, as well as from column fluidic interfaces. The row fluidic channel 223 may then be fluidly connected with the corresponding fluidic pins 230 via the fluidic interfaces on each side of row fluidic channel 223 and isolated from other fluidic channels and structures. Similarly, each row fluidic channel may be fluidly connected to its corresponding pair of fluidic pins, and be isolated from other fluidic channels and structures by its corresponding pair of ridges.

Figure 8:
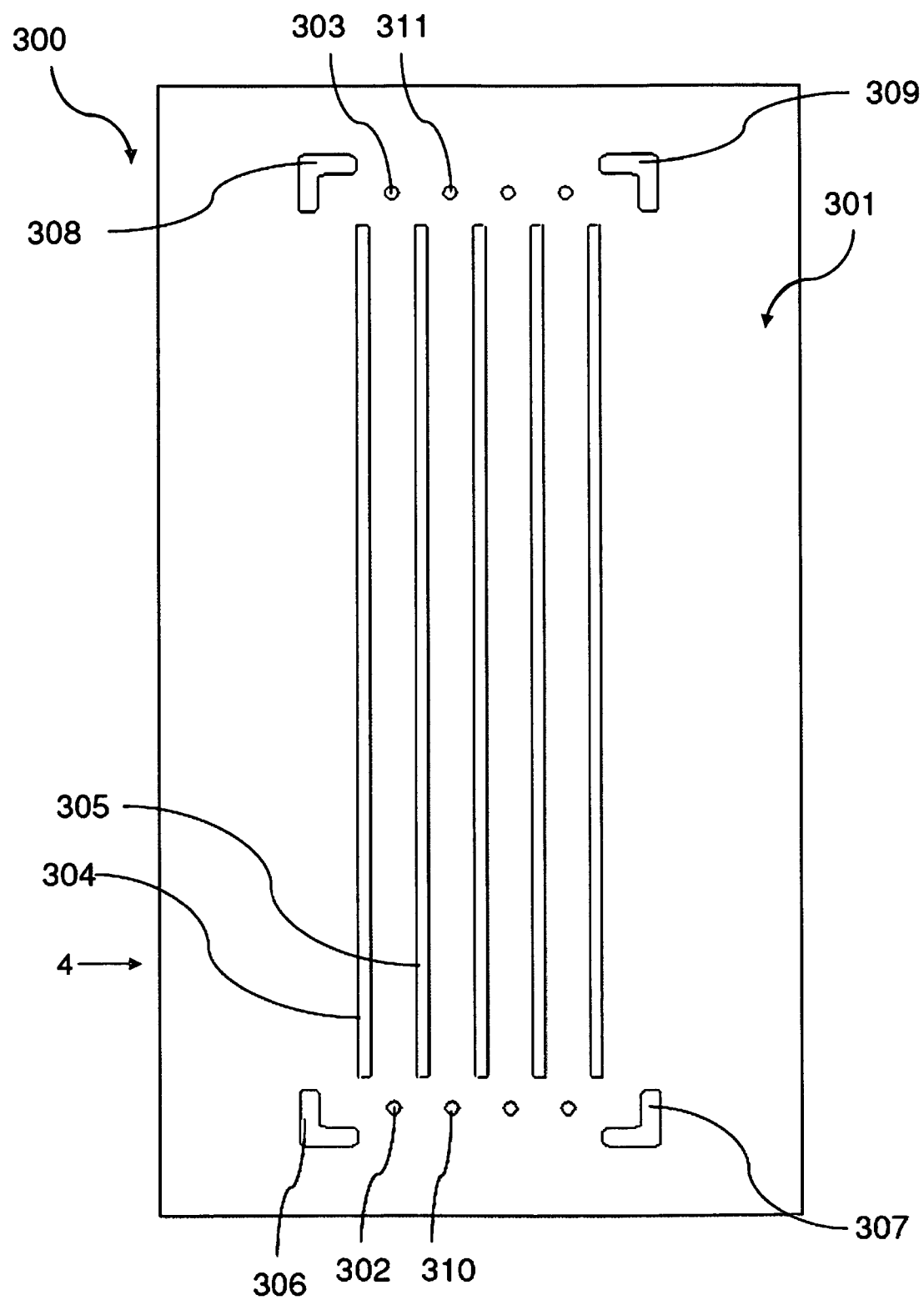
FIG. 8 is a top view of an embodiment fluidic stage used to block fluidic channels in rows on an embodiment fluidic array device.

FIG. 8 shows a top view of an embodiment stage 300 that may be used to block row fluidic channels of an embodiment fluidic array device, such as the devices 10 and 100. On the top 301 of the stage 300 are four framing corners 306-309, a plurality of ridges, two of which are marked as 304 and 305, and two rows of through holes on corresponding sides of the ridges, four of which are marked 302, 303, 310 and 311. The four framing corners 306-309 are used to align the fluidic array device on the stage 300. The height of the ridges 304, 305 is sufficient to block or pinch the row fluidic channels, such as the channels 11 in the device 10 when the device 10 is clamped onto the top 301 of the stage 300. The two rows of through holes correspond to the fluidic interfaces in the fluidic device for the column channels.

Figure 9:
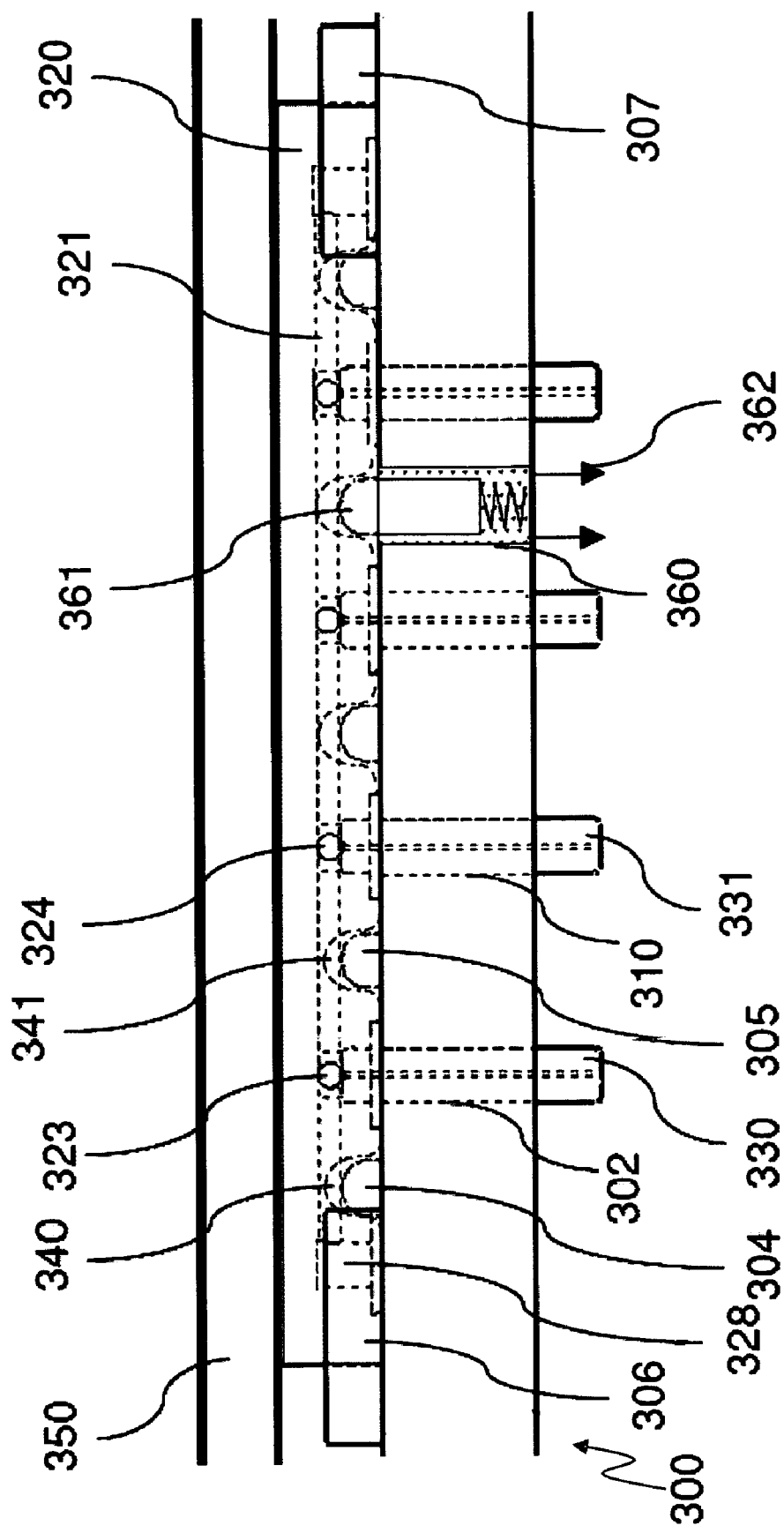
FIG. 9 is a side view of a portion of the fluidic stage shown in FIG. 8 with an assembly of fluidic pins, a fluidic array device, and a ridge clamping plate.

FIG. 9 is a side view of a portion of the fluidic stage 300 shown in FIG. 8 from direction 4 and further including fluidic pins 330, 331, and a clamping plate 350. A fluidic array device 320 is disposed onto the top 301 of the stage 300. Corners 306, 307, together with the two other corners 308, 309, align the fluidic array device 320 with the stage 300. The device 320 may, for example, be similar to the device 10 and with the same structures and configurations as the device 10. Fluidic channels 321 and 323 correspond to the fluidic channels 11 and 12 of the device 10. The fluidic pins 330, 331 may have the same structure as the fluidic pin 130 shown in FIG. 5, and are disposed through the through holes 302, 310 and plug into corresponding recesses and fluidic interfaces of the device 320. The plate 350 may be a rigid plate that clamps onto the top of the fluidic device 320. Because the device 320 is made from an elastomic material, once it is clamped onto the stage 300 by way of the plate 350, the row fluidic channels 321 are pinched closed at positions corresponding to the ridges 304, 305, as shown at positions 340 and 341. The column fluidic channel 323 is isolated from the row fluidic interface 328 by the ridge 304 at position 340, and from the adjacent column fluidic channel 324 by the ridge 305 at the position 341. The column fluidic channel 323 may then be connected with fluidic pins 330 on both sides at respective fluidic interfaces and isolated from other fluidic channels and structures. Similarly, other column fluidic channels may be isolated by their respective pairs of ridges, and fluidly connected by their respective pairs of fluidic pins.

The ridges described in FIGS. 7 and 9 work as a pinch valves to close the fluidic channels. As shown in FIG. 9, another embodiment may dynamically create such pinch valves by way of linear actuators 360. A linear actuator 360 may be any suitable device, such as a solenoid, a pneumatic device, a hydraulic device, a magnetostrictive actuator, etc., and may include a core 361 that moves up and down to close and open the corresponding fluidic channel. The actuator 360 may further include suitable connectors 362 to connect to a driver (electrical, hydraulic, etc.) to drive the actuator 360.

To demonstrate how an embodiment may be used in molecular analysis, an example DNA analysis of normal and mutant alleles is presented by way of the fluidic array device 10. The device 10 may be made from PDMS. The row fluidic channels 11 may be used for cDNA probe configuration purposes, and the column fluidic channels 12 may be used for sample injection.

SURFACE MODIFICATION EXAMPLE

Surface wetting properties may depend on two primary factors: surface chemistry and roughness. Varying the surface chemistry allows contact angles of up to 120° on flat surfaces, while varying the surface roughness enables increases in hydrophobicity. Roughness for a hydrophobic surface maybe introduced, for example, by techniques such as plasma treatment, chemical etching, chemical vapor deposition (CVD), micropatterning with templates, electrospray polymer nanotubes and so forth. Another approach for decreasing the surface energy is achieved by the chemical bonding of low surface energy species.

Due to the inherent hydrophobicity of PDMS, the inside surface of the fluidic channels 11 and 12 in the device 10 repel aqueous solutions. Selected surfaces may thus be modified to change their respective surface wetting properties, such as to confer hydrophilicity so that, for example, amino ($NH_2$) groups or thiol (SH) groups can be grafted onto such surfaces for subsequent attachment of a variety of molecules of interest.

Surface modifications may be performed, for example, by way of the following procedure: 1. Washing. The device 10 is immersed in a solution of $H_2O$, $H_2O_2$, and HCl having volumetric ratios of 70:15:15. The solution is also pumped through all of the fluidic channels 11, 12 for 5 minutes. The device 10 is then washed, and the channels 11, 12 are purged with deionized (DI) water. The device 10 is dried in dry air. 2. Silanol coupling. Neat (3-aminopropyl) trimethoxy silane reagent is pumped into all of fluidic channels 11, 12 for 30 minutes at room temperature. This step generates aminografted surfaces on the inside surfaces of the fluidic channels 11, 12. 3. Isothiocyanate grafting. 0.5% (v/v) thiophosgen solution in MeCN is pumped into all fluidic channels 11, 12 for 10 minutes at room temperature, and then purged with DI water and dry air.

After this procedure, the inside surfaces of the fluidic channels 11, 12 of device 10 may be subjected to coupling with, for example, amino-terminated biomolecules, such as singlestranded DNA.

PROBE CONFIGURATION EXAMPLE

To configure the intersection spots 13 in the device 10, first, the device 10 may be placed on the stage 200 to form an assembly as shown in FIG. 7. The column fluidic channels 12 are blocked by the ridges on the stage 200. Each row fluidic channel 11 is then connected through the fluidic pins on each side of the respective fluidic interfaces for probe configuration. In this embodiment, cDNA probes and samples of cystic fibrosis (CF) are used. CF is one of the most common autosomal recessive genetic diseases in the Caucasian population. The three most common mutations of the CFTR gene may be selected. Their identities and relative frequencies (%) are: ΔF508 (66.0%); G551D (1.6%); and N1303K (1.3%).

Probe configuration may then be performed using, for example, the following procedure: 1. Washing. Each row channel 11 is pumped with DI water through the corresponding fluidic pins, followed with air dry. 2. Double wild-type, mutant, and control probes, are configured onto the device 10 by pumping probe solution through the corresponding fluidic pins into the each fluidic channel 11, so that the row fluidic channel is configured with the same probe. The device 10 and the stage 200 are heated to 52° C. before the respective probe solutions are loaded into each channel 11. The solutions remain in each channel 11 for 60 minutes. 3. Washing. Tris-buffer solution (ph 7.4) is pumped into each channel 11 to purge the residual probe solutions.

After the above configuration steps, the respective DNA probe fragments are coupled onto the surface of each channel 11. During probe configuration, the probe solution can be pumped forward and backward along the channel 11 at a controllable flow rate using any suitable pump fluidly connected to the corresponding pins. This dynamic flow of the probe solutions may increase the efficiency of the reaction between the surface of the channel 11 and the respective probe solution, and thus increase the usage efficiency of the probe solution.

HYBRIDIZATION REACTION EXAMPLE

To analyze DNA targets with the device 10, first, the device 10 is placed on the stage 300 to form an assembly as shown in FIG. 9. Each row fluidic channel 11 is thereby blocked by the ridges on the stage 300. Each column fluidic channel 12 is connected to the DNA target solution through the corresponding fluidic pins on each side of the fluidic interfaces. Fluorescence-labeled target DNA solutions may be used to show application of DNA mutation analysis. Homozygous wild-type, homozygous mutant, heterozygous, and control target solutions are pumped into each respective fluidic channel 12.

By way of example, the following hybridization procedure may then be performed: 1. Prehybridization. The device 10 and the stage 300 are heated to 52° C. Prehybridization solution (Gibco BRL) preheated to 52° C. is pumped into each fluidic channel 12 for 10 minutes. 2. Hybridization. The target DNA solutions, preheated to 52° C., are pumped into each respective fluidic channel 12. The solutions are pumped forwards and backwards in the channels 12 for 30 minutes. 3. Washing. Tris-buffer solution (preheated to 52° C.) is pumped through the channels 12 for 1 minute to wash out residual DNA solutions.

During the hybridization reaction, the target solutions may be pumped forwards and backwards along their respective channels 12 at predetermined flow rates. This dynamic flow of the target solutions may increase the efficiency of the reactions between the probes on the surface of the intersection spots and the target solutions. The usage efficiency of the sample solutions is thus also increased.

DNA hybridization reaction analysis is simply one example; other chemical or biochemical reactions can also be used in the embodiment fluidic array devices for chemical, molecular, cellular, or tissue detection and analysis. For example, for protein analysis, antibody probes can be configured at the intersection spots, and antigen samples can be loaded into the device. Antibody-antigen interactions will then occur in the intersection spots.

In preferred embodiments, the top surface or body of the device 10 is optically transparent or translucent. The resulting DNA hybridization can be measured and quantified from the top of the device 10 under a fluorescence microscope or by a microarray reader.

The above embodiment application illustrates cDNA probe coupling in the entire row channel, and target DNA analysis at the intersection spots of the probe-coupled channels with the column fluidic channels into which the target DNA samples are loaded. Embodiments below show improvements over the device 10, 100 to couple molecular probes only at the intersection spots. Other embodiments, also discussed below, provide structures at one or more intersection spots to increase the coupling and reaction efficiencies.

Figure 10:
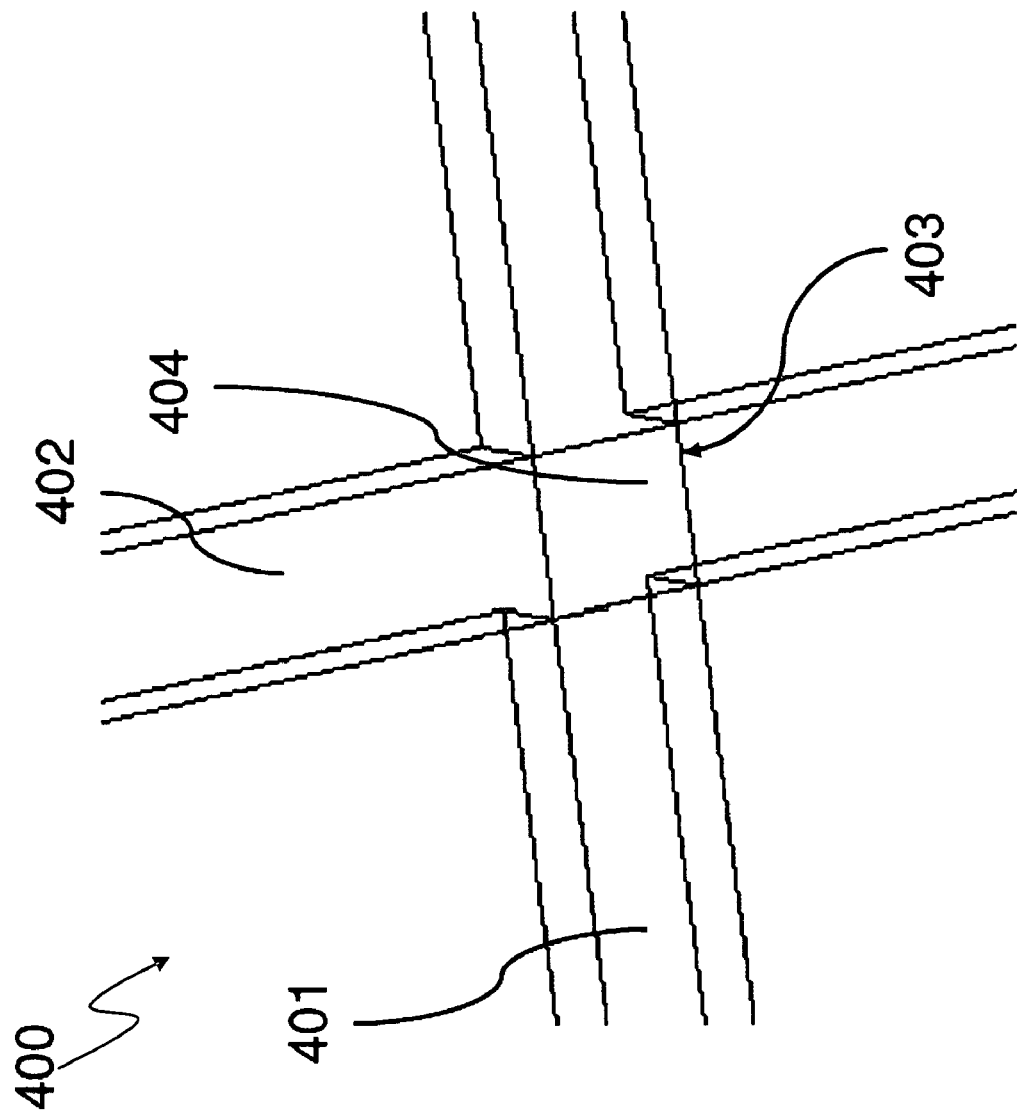
FIG. 10 is a perspective view of an intersection spot with surface modifications in an embodiment fluidic array device.

FIG. 10 shows an intersection spot 403 that has a surface modification at the bottom area 404 in a fluidic array device 400. The device 400 can be made, for example, from the same elastomeric materials as the device 10, or from an elastomeric material with a rigid cover, as with the device 100. The device 400 may have two fluidic channels to form the corresponding intersection spot 403, but greater numbers of fluidic channels are certainly possible to create an array of intersection spots, as shown in devices 10 and 100. Crossing of the fluidic channel 401 with the fluidic channel 402 forms the intersection spot 403.

The surface of a device made, for example, from PDMS is typically hydrophobic. Because the embodiment devices may be made using a liquid polymer molding process, the surface properties of the devices can be modified by the corresponding surfaces of a mold component. By way of example with the fluidic channels 401 and 402, and the corresponding intersection spot 403, a flat, cross-shaped mold component can be used. All the surfaces of the mold component, except that corresponding to the bottom surface 404 of the intersection spot 403, may be highly polished to an extremely smooth, mirror-like surface. On the other hand, the surface of the mold component corresponding to the bottom side 404 of the intersection 403 can be modified to have a textured surface, such as a surface that has been sand-blasted or otherwise modified for a certain roughness. As a result, the surfaces of the channels 401 and 402 made from this mold component will have regions in which the surface wetting property of a respective region changes from that of another region; for example, the surfaces of the channels 401 and 402 may have surface wetting properties that are hydrophobic except for the intersection area 404, which will have a hydrophilic surface wetting property. Hence, the surface wetting properties of a region of a channel 401, 402 outside of an intersection spot 403 may be different from the surface wetting properties of the region of the channel 401, 402 that includes the intersection spot 403. This hydrophilic region 404 at the intersection spot 403 may more easily trap molecules or cells than the other hydrophobic areas in the channels 401, 402. For probe configuration of the device 400, a molecular probe, such as a DNA fragment, may couple only onto the region area 404, rather than to the entire channel areas as the device 10, 100. The usage efficiency of the probe is thus significantly improved. Similarly, during a subsequent molecular reaction, such as DNA hybridization between the probe on the area 404 and the target solution, the reaction may only occur in the area 404, and so the usage efficiency of the sample is also much greater. The reaction result in the area 404 can be read out in a standard manner.

Figure 11:
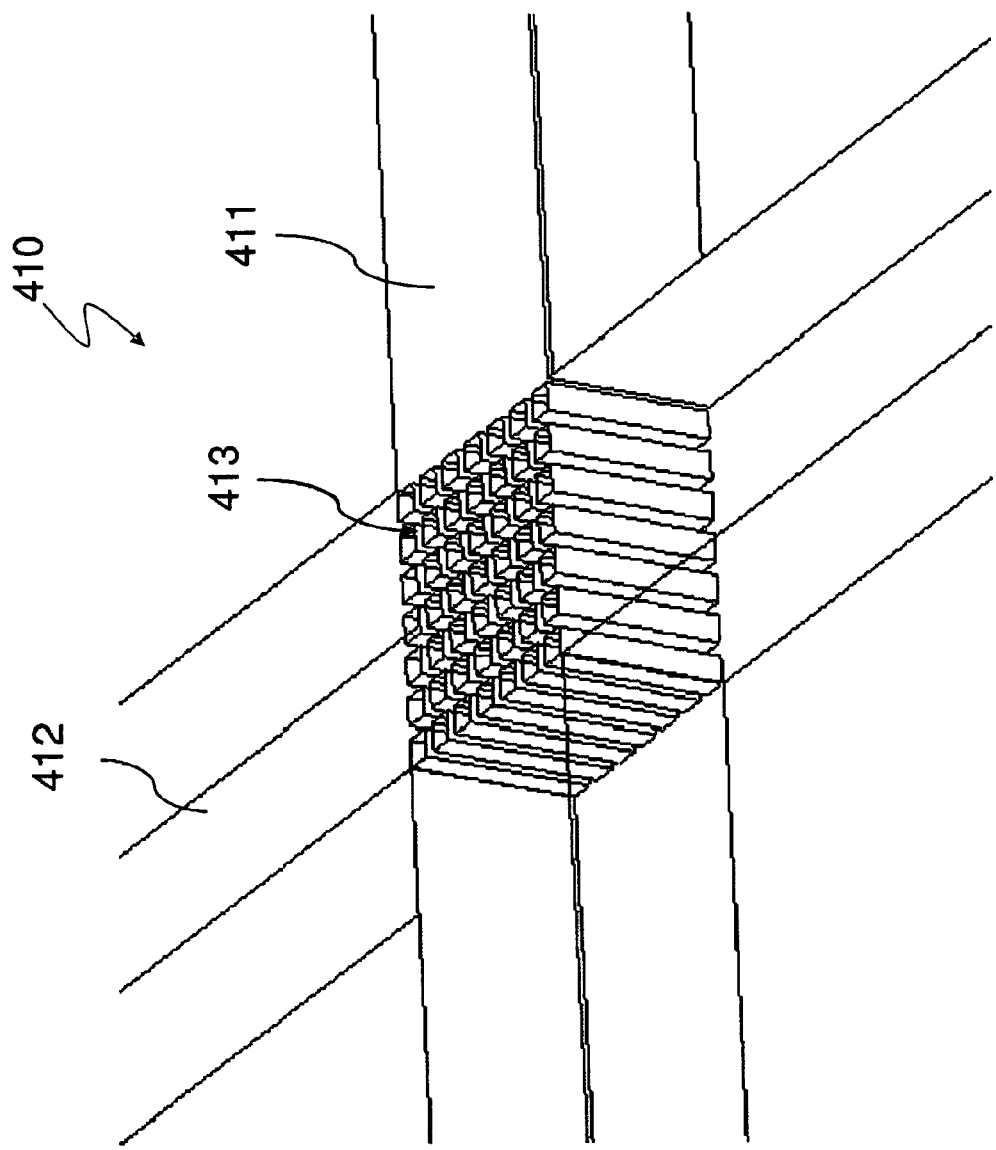
FIG. 11 is a perspective view of an intersection spot with square columns in an embodiment fluidic array device.

Other textures may be formed in the intersection spots. FIG. 11 is a perspective view of an intersection spot 413 with square columns in an embodiment fluidic array device 410. The devices 410 can be made from the same elastomeric material as the device 10 or an elastomeric material with a rigid cover, as in the device 100. The device 410 may have two or more fluidic channels to create one or more intersection spots 413. Crossing of the fluidic channel 411 with the channel 412 forms the intersection spot 413. The square columns at the intersection spot 413 increase surface area of the spot 413 which can thus capture more molecular probes onto the surface of the columns. The usage efficiencies of the probe and the sample are thereby increased. The columns may be made, for example, by a suitably formed sacrificial mold, as disclosed in previously-mentioned U.S. Pat. No. 7,125,510, which is incorporated herein by reference. It will be appreciated that the columnar structures described above and below may be further modified to incorporate nanostructures, such as nanotubes, as described later.

Figure 12:
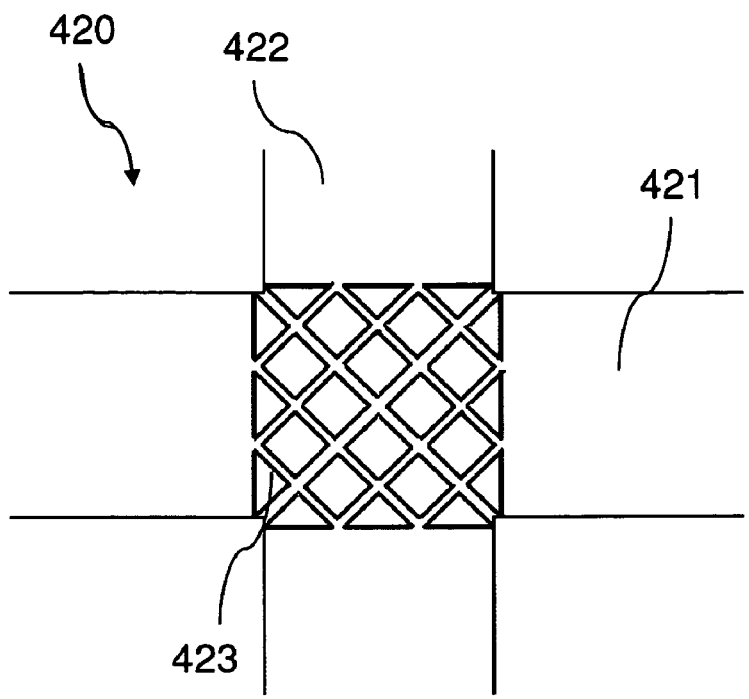
FIG. 12 is a top view of an intersection spot with diamond columns in an embodiment fluidic array device.
Figure 13:
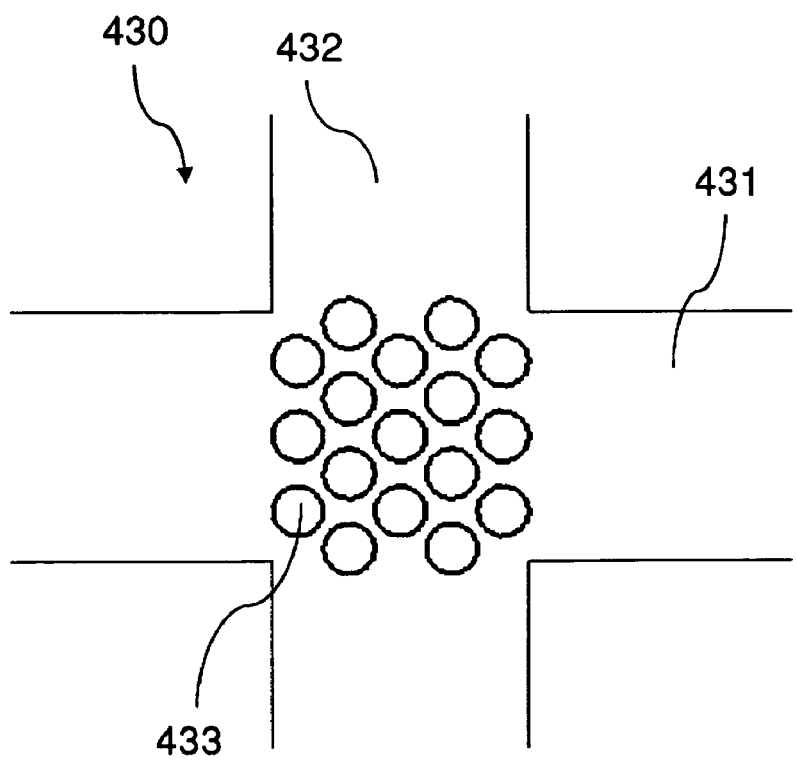
FIG. 13 is a top view of an intersection spot with round columns in an embodiment fluidic array device.

FIGS. 12 and 13 are top views of intersection spots 423 and 433 with diamond-shaped and rounded columns in fluidic array devices 420 and 430, respectively. The devices 420 or 430 may be made from the same elastomeric materials as the device 10, or with an elastomeric material and a rigid cover as in the device 100. The devices 420, 430 may have two or more fluidic channels to create one or more intersection spots 423, 433. Crossing of the fluidic channel 421, 422 with the channel 431, 432 forms the intersection spot 423, 433. The diamond-shaped and rounded columns in the devices 420, 430 may provide functions similar to those of the square columns in the device 410 and so increase the usage efficiencies of the probe reagents and the sample solutions.

Figure 14:
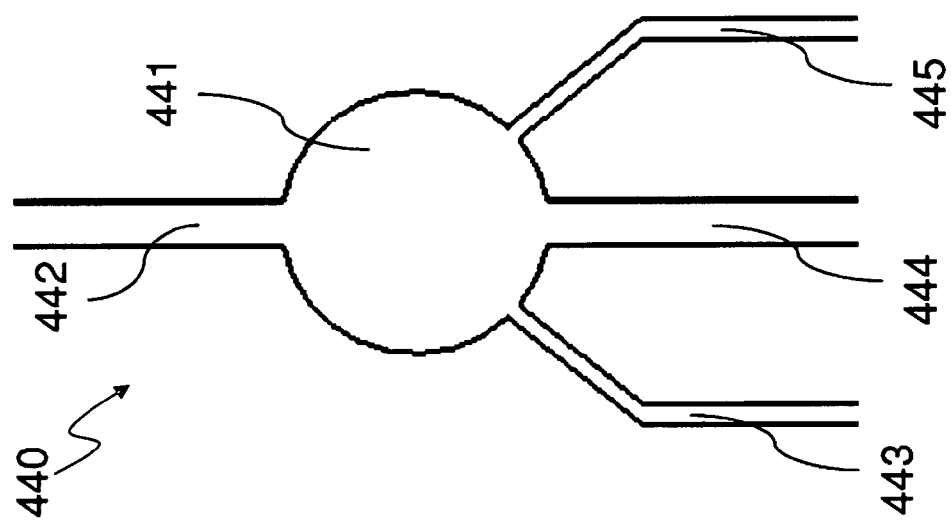
FIG. 14 is a top view of an intersection spot with three inlet fluidic channels and an outlet channel in an embodiment fluidic array device.

FIG. 14 shows a top view of a rounded intersection spot 441 with fluidic channels 442, 443, 444, and 445 in a fluidic device 440. The channels 443, 444, and 445 can be used as fluidic inlets, and the channel 442 as an outlet. Each fluidic inlet channel 443-445 can be connected to the intersection spot 441 individually or simultaneously by ridges or linear actuators on a stage for the device 440, thus closing or opening the channels 443-445. The surface in the intersection spot 441 can be made to be hydrophilic by modifying the corresponding regional surface of a mold component, as described with reference to FIG. 10. Inside the intersection spot 441, columns can be also made, as described with reference to FIGS. 11, 12, and 13. Although FIG. 14 shows but one intersection spot 441 in the device 440, it will be understood that more intersection spots can be made in the device 440 to form a fluidic array for parallel analysis and synthesis.

FIGS. 11, 12, and 13 show certain preferred embodiments, but other shapes and numbers of columns at the intersection spots can be created in consideration of molecular size, cell size, fluidic distribution, and differing types of applications such as genomics, proteomics, and cell immobilization and culturing.

FIG. 14 shows a preferred embodiment with multiple inlets and a single outlet, but other numbers of fluidic inlets and outlets at respective intersection spots can be created according to application requirements. Various embodiment fluidic array devices can be used in many different applications, including analytical chemistry, biological diagnosis, medical diagnosis, food testing, environmental testing, biodefence, and drug detection and screening. The devices described herein can be also used in chemical synthesis. Although some examples have been discussed above, other implementation and applications are also within the scope of the following claims.

SURFACE NANOENGINEERING MODIFICATION EXAMPLE

Figure 15:
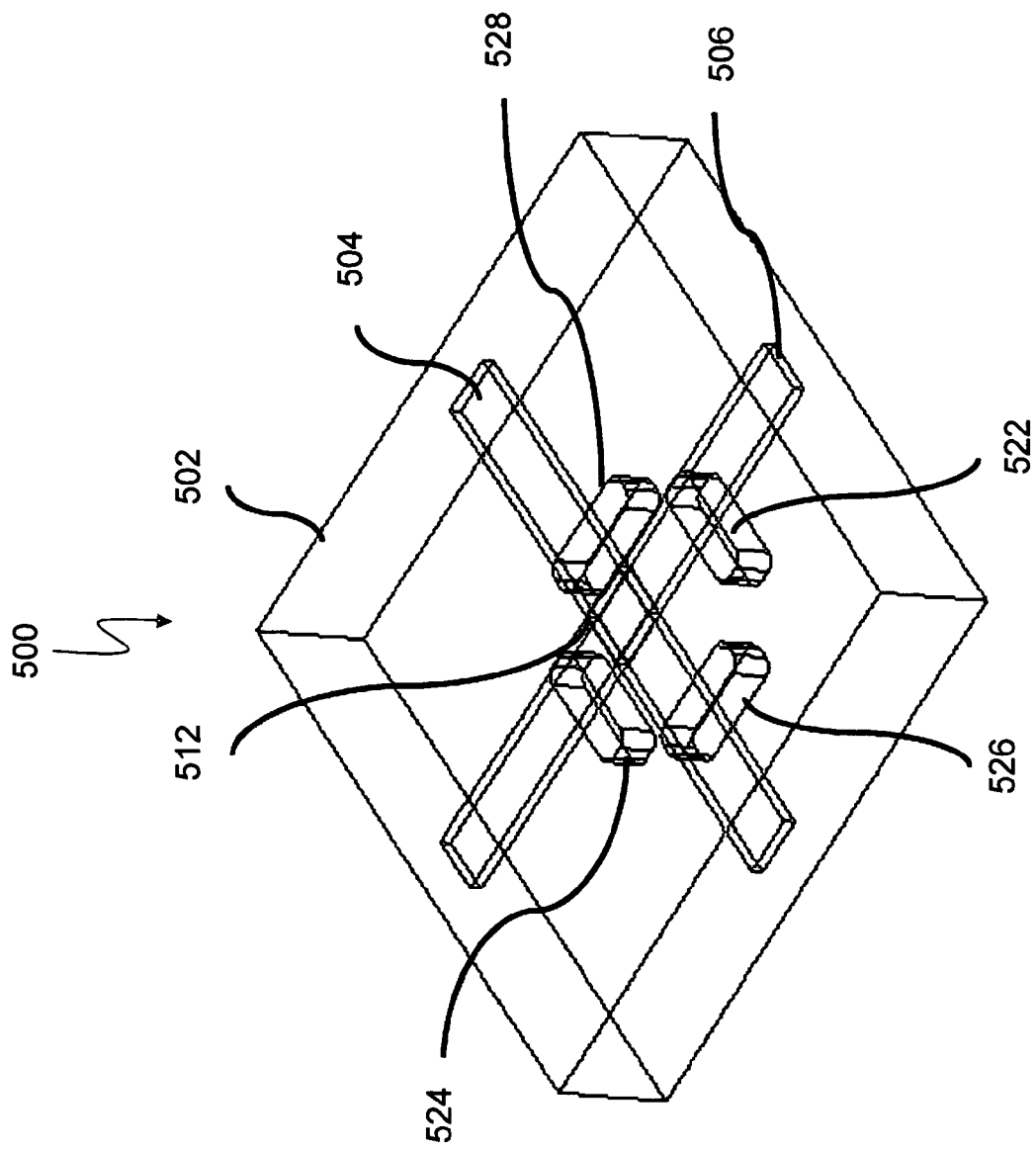
FIG. 15 is a perspective view of one spot at an intersection of two channels in an embodiment fluidic array device.
Figure 16:
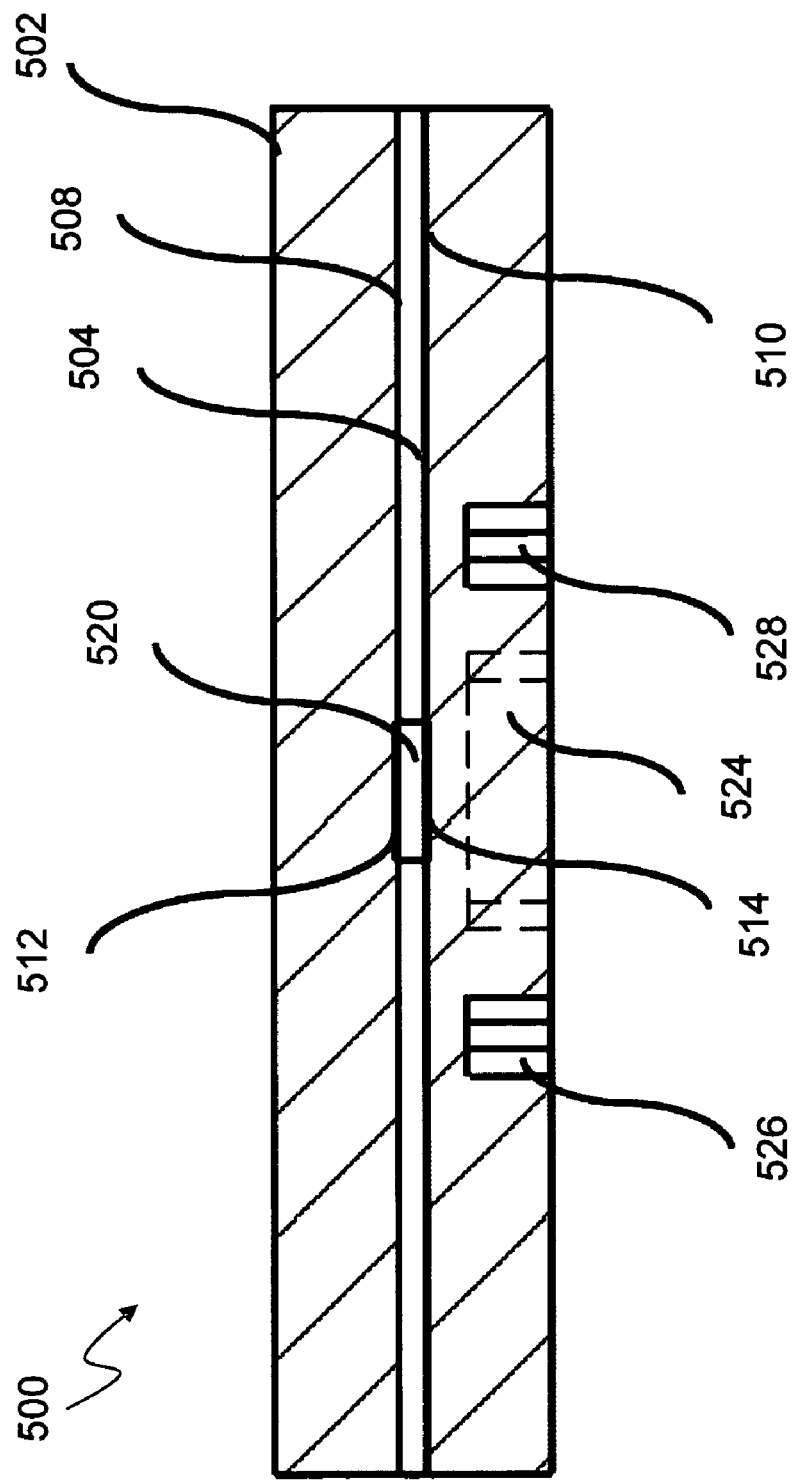
FIG. 16 is a sectional view of the array device of FIG. 15 along the center of one channel.

Nanofabrication opens a new window for microfluidics. FIG. 15 shows a perspective view of one intersection spot 520 at an intersection of two channels in another embodiment fluidic array device 500. FIG. 16 is a sectional view of the device 500 shown in FIG. 15. The device 500 includes a body 502, which may be similar to the elastomeric bodies described above. Inside the body 502, a fluidic channel 504 and a fluidic channel 506 intersect to form the intersection spot 520. The fluidic channels 504, 506 may be, for example, rectangular with an aspect ratio from 1:5 to 1:1000. The respective top surfaces 508 and 516 and bottom surfaces 510 and 518 of the fluidic channel 504 and 506 can be nanoengineered to obtain certain surface wetting properties, while the top surface 512 and the bottom surface 514 at the intersection spot 520 can be nanoengineered to another surface wetting property. The fluidic channels 504 and 506 can be closed at both of their respective sides of the intersection spot 520 at positions of 522, 524, 526 and 528. In certain embodiments the positions of 522, 524, 526, and 528 may include, for example, recesses in the body 502 to receive the ridges or linear actuators described above to close and open the channels 504, 506.

Figure 17:
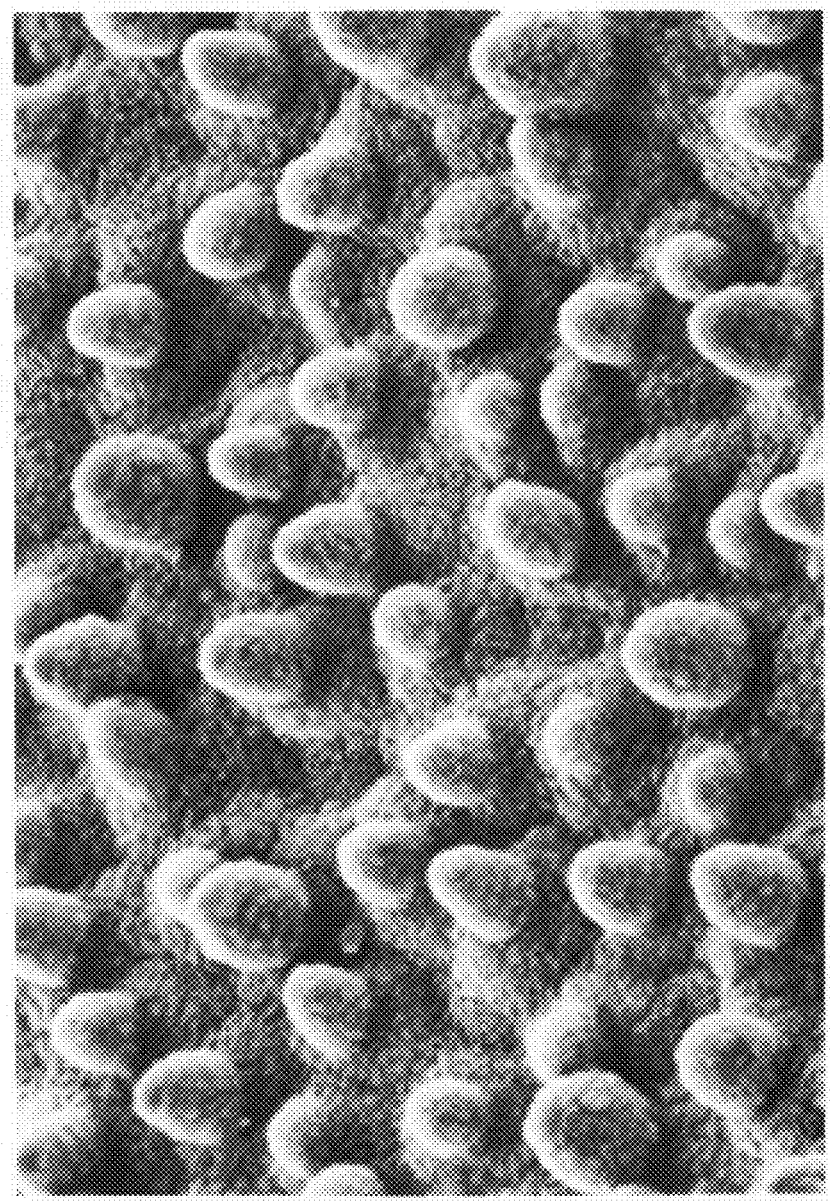
FIG. 17 is a SEM picture of a lotus leaf that is covered with protruding nubs covered by tiny wax crystals.
Figure 18:
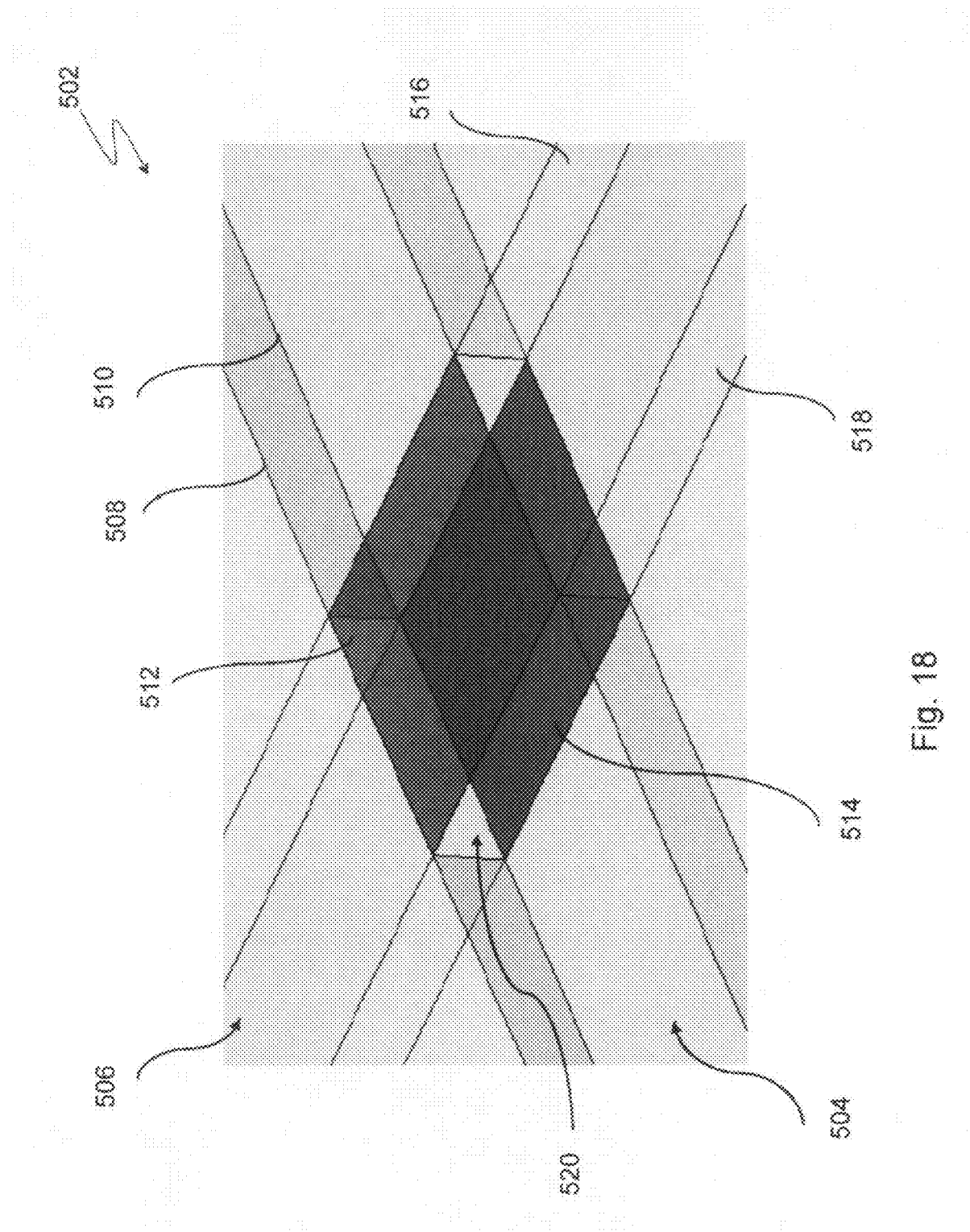
FIG. 18 is a detailed perspective view of one spot at an intersection of two channels in the fluidic array device shown in FIG. 15.

FIG. 17 shows a SEM picture of a lotus leaf that is covered with protruding nubs covered by tiny wax crystals (between 200 nanometers and 2 micrometers in size). When a drop of water touches the solid lotus leaf surface, both the solid surface and the drop are surrounded by air and the drop thus cannot spread out over the surface. It has been predicted that on a nanostructured hydrophobic surface similar to that of a lotus leaf, slipping is present that could result in a 99% (on an open surface) or over 95% (in a confined microchannel) reduction of the drag predicted in the no-slipping model. This nanoengineered surface may be utilized to channel surfaces and significantly reduce pressure requirements for micropumps. Furthermore, surface nanofabrication enables the creation of channels with different surface wetting properties in different sections. As shown in FIG. 18, for example, the top surface 512 and the bottom surface 514 at the intersection 520 can be modified to have surface properties that are different from those of the top surfaces 508 and 516 of the channels 504 and 506, respectively, and from those of the bottom surfaces 510 and 518 of the channels 504 and 506, respectively.

As an embodiment that may be suitable, for example, for protein analysis, at the intersection spot 520 the top and the bottom surfaces 512 and 514 are made to be slightly hydrophobic, that is, with a surface contact angle of around 100 degrees, whereas the top and bottom channel surfaces 508, 516, 510 and 518 are made to be super-hydrophobic like a lotus leaf, that is, with a surface contact angle of around 150 degrees. Because all biomolecules have some degree of surface activity and tend to bind to hydrophobic surfaces, the hydrophobic surfaces 512 and 514 at the intersection spot 520 immobilize the antigen or the antibody as a probe for analysis purposes. However, if a surface is super-hydrophobic, liquid cannot spread over the surface; biomolecules in the liquid, therefore, do not have a chance to touch the surface, and hence little or no protein bonding on such surfaces occurs. Moreover, for these same reasons, little or no contamination occurs when aqueous solutions are transported through the channels 504, 506 where the top and the bottom surfaces 508, 516, 510 and 518 are modified to be super-hydrophobic.

For the configuration of protein probes of the embodiment intersection spot 520, the fluidic channel 506 can be closed at positions 522 and 524. An antigen or antibody probe solution may then be driven through the fluidic channel 504. Because the protein molecules bind to hydrophobic surfaces, they are immobilized on the entire surfaces 512 and 514 at the intersection spot 520.

For protein reactions at the embodiment intersection spot 520, the fluidic channel 504 can be closed at positions 526 and 528; a sample solution may then be driven through the fluidic channel 506. The antibody or antigen in the sample solution may have a specific reaction with the antigen or antibody probe bonded onto the surfaces 512 and 514.

As another embodiment suitable for DNA analysis, the top and the bottom surfaces 512 and 514 at the intersection spot 520 may be provided nanostructures. The nanostructures may be concave-shaped and/or convex-shaped, with the size of each nano-sized structure being in a range from, for example, 2 nanometers to 50 nanometers. The nanostructured surfaces 512 and 514 may be configured to increase the respective surface areas of the surfaces 512, 514 and therefore increase cDNA or olig bonding within the region 520. The top and the bottom channel surfaces 508, 516, 510 and 518 may be made to be super-hydrophobic, like a lotus leaf—that is, the surface contact angle may be made to be around 150 degrees. With such super-hydrophobic surfaces 508, 516, 510, 518, liquid cannot spread over the surfaces 508, 516, 510, 518, and therefore there will be little or no binding of DNA or other biomolecules onto the surfaces 508, 516, 510, 518, and little or no contamination when aqueous solutions are transported through the corresponding channels 504, 506 formed by the surfaces 508, 516, 510, 518.

Figure 30:
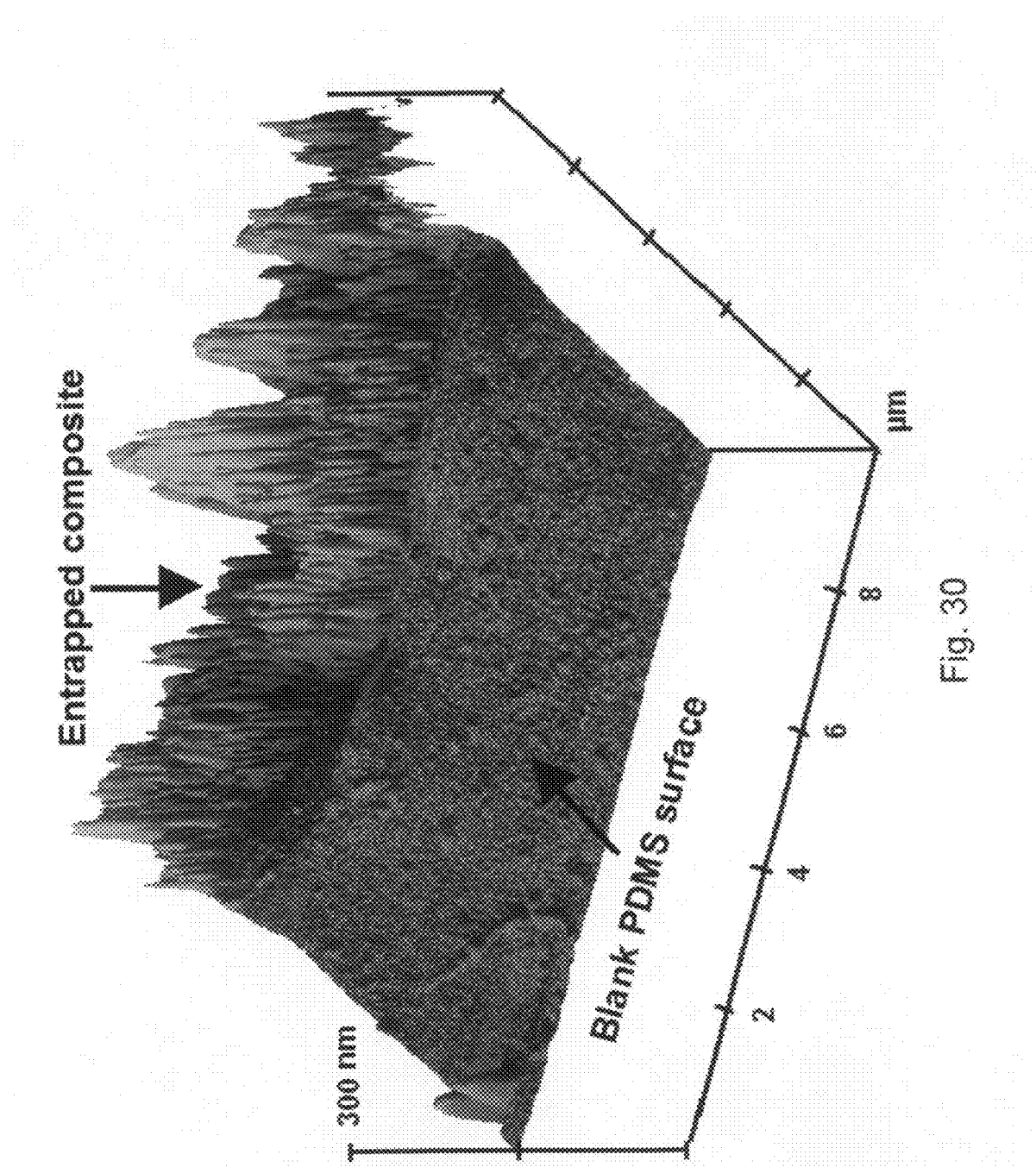
FIG. 30 shows an Atomic Force Microscope (AFM) image (in Tapping-Mode) of a spot of polymer/carbon nanotube nanocomposites embedded on a polydimethylsiloxane (PDMS) surface.

In certain specific embodiments, nanomaterials, such as carbon nanotubes, may be embedded or entrapped on one or more surfaces of the body 502, including within the columnar structures shown in FIG. 11-13. Further reference is drawn to FIG. 30, which shows an Atomic Force Microscope (AFM) image (in Tapping-Mode) of a region with a polymer/carbon nanotube embedded on the surface. The AFM is a very high-resolution scanning probe microscope with demonstrated resolutions of fractions of a nanometer and provides a true three-dimensional surface profile. The front part of FIG. 30 shows a blank surface that is basically a flat surface. The back part shows a surface where carbon nanotubes, are entrapped. The nanotubular features on the surface significantly increase the surface area for biomolecular binding. Another interesting feature in FIG. 30 is that the nanotubes stand upright on the surface. The upright nanotubes provide an ideal substrate for biomolecular probe-binding orientation. The nanotubes may be entrapped, for example, to top 512 and/or bottom 514 surfaces of the intersection spot 520 to improve the reaction characteristics of the intersection spot 520, as discussed later.

For the configuration of, for example, DNA probes, antibodies or the like at the embodiment intersection spot 520, the fluidic channel 506 can be closed at the positions 522 and 524, and a cDNA, or g probe solution or the like may then be driven through the fluidic channel 504. Because of ultraviolet crosslinking, covalent attachment, or molecular adsorption, the probe may be immobilized over the entirety of the surfaces 512 and 514 at the intersection spot 520.

To perform, for example, DNA hybridization, protein antibody-antigen reaction or the like at the embodiment intersection spot 520, the fluidic channel 504 can be closed at positions 526 and 528; a sample solution may then be driven through the fluidic channel 506. The DNA in the sample solution may undergo a hybridization reaction with the probe bonded to the surfaces 512 and 514. The flow state of the channels 504, 506 may be similarly controlled to provide other types of reactions in the device 500.

By way of a specific example of an embodiment nanoengineered device 500 that may be used in biological analysis applications, DNA probe binding and target hybridization tests utilizing the Cystic Fibrosis F508 wild-type allele may applied to the spots 520 where carbon nanotubes with carboxyl groups (COOH) on their surfaces are entrapped. The nanotubes may be activated for DNA binding using, for example, 2 mM 1-ethyl-3-(3-dimethylaminopropyl) carbodiimide hydrochloride (EDC) and 5 mM N-hydroxysuccinimide (NHS) in dimethylformamide (DMF) (1:1 by volume). Oligonucleotide probes complemenary to CF-F508 allele maybe attached to the nanotubes in spots 520 by incubation of the oligo for 1 hour at room temperature. The spots 520 may then be washed and prehybridized with prehybridization solution at 52° C. for 10 minutes. After prehybridization, the target oligonucleotide (1 μM, labeled with Cy3) in TNSE buffer may be applied and incubated for 30 min at 52° C. The spots 520 may then be washed and imaged with a fluorescence microscope. The entire process, from configuration of the spots 520 to fluorescent readout may be completed in less than two hours. This is a significant improvement over current microarrays which require 1 or more days for chip production, 1 to 3 days for target sample labeling and 16 hours for hybridization. The improvement seen may be due to the increased surface area afforded by the three-dimensional nanoarchitecture of the nanotubes within the spots 520 and the highly dense functional groups on the nanotube surfaces.

Figure 19:
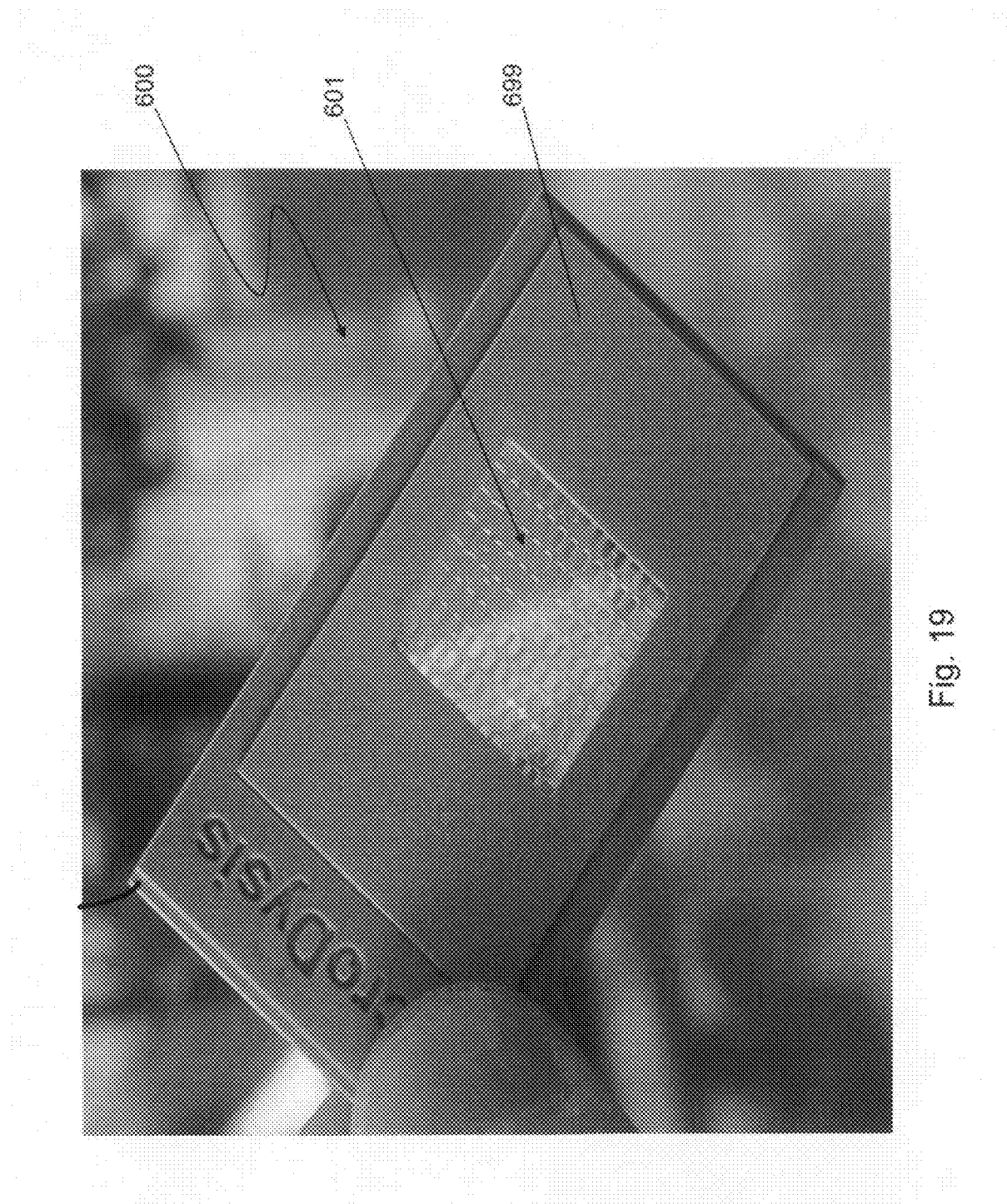
FIG. 19 is a photograph of an embodiment fluidic array device.
Figure 20:
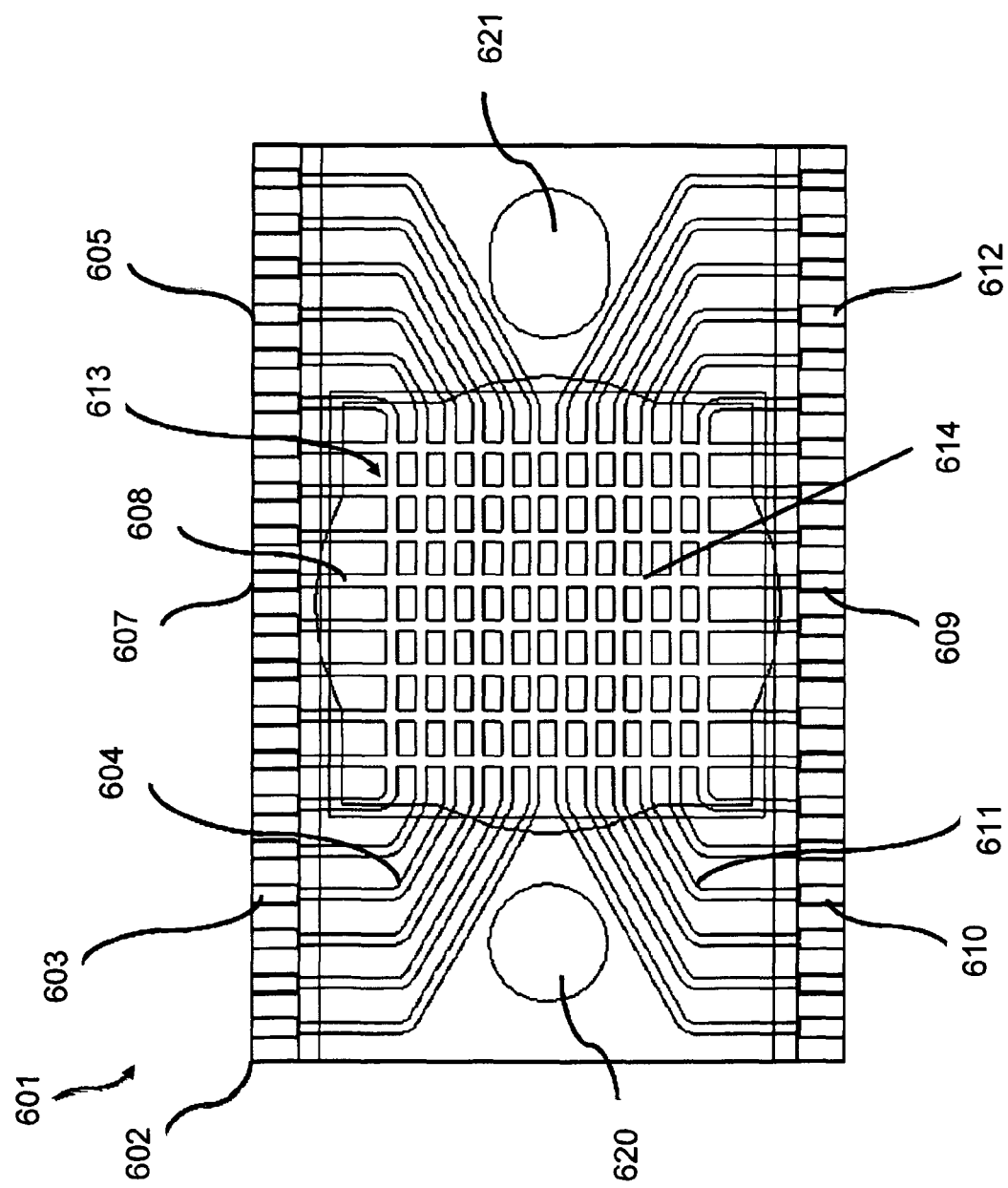
FIG. 20 is a top view of a core of the fluidic array device shown in FIG. 19.

FIG. 19 is a photograph of an embodiment fluidic array device 600 with 96 intersection spots created by the intersections of 12 by 8 fluidic channels. FIG. 20 is a top view of a core 601 of the fluidic array device 600 shown in FIG. 19. Retaining frame 699 may be used to secure and hold the core 601 within the device 600. The core 601 of the device 600 includes a body 602 that may be made from, for example, PDMS or another elastomeric material, 12 row fluidic channels 604, 611, eight column fluidic channels 608, and alignment holes 620 and 621. The 12 row fluidic channels 604, 611 and eight column fluidic channels 608 form 96 intersection spots 614 in middle window area 613. Six of the 12 row fluidic channels 604 interface via the top half of the core 601 with fluidic interfaces 603, 605. The other six of the 12 row fluidic channels 611 interface via the bottom half of the core 601 with fluidic interfaces 610, 612. For the eight column fluidic channels 608, fluidic interfaces 607, 609 are disposed on both sides of the body 602. Because the body 602 is made from PDMS or another elastomeric material, all of the fluidic channels 604, 608, 611, may be pinched closed, and hence the intersection spots 614 can be fluidly separated from each other in both the column and row directions, and configured with different probes. As disclosed earlier, chemical or biochemical interactions can then occur at the intersection spots 614.

Figure 21:
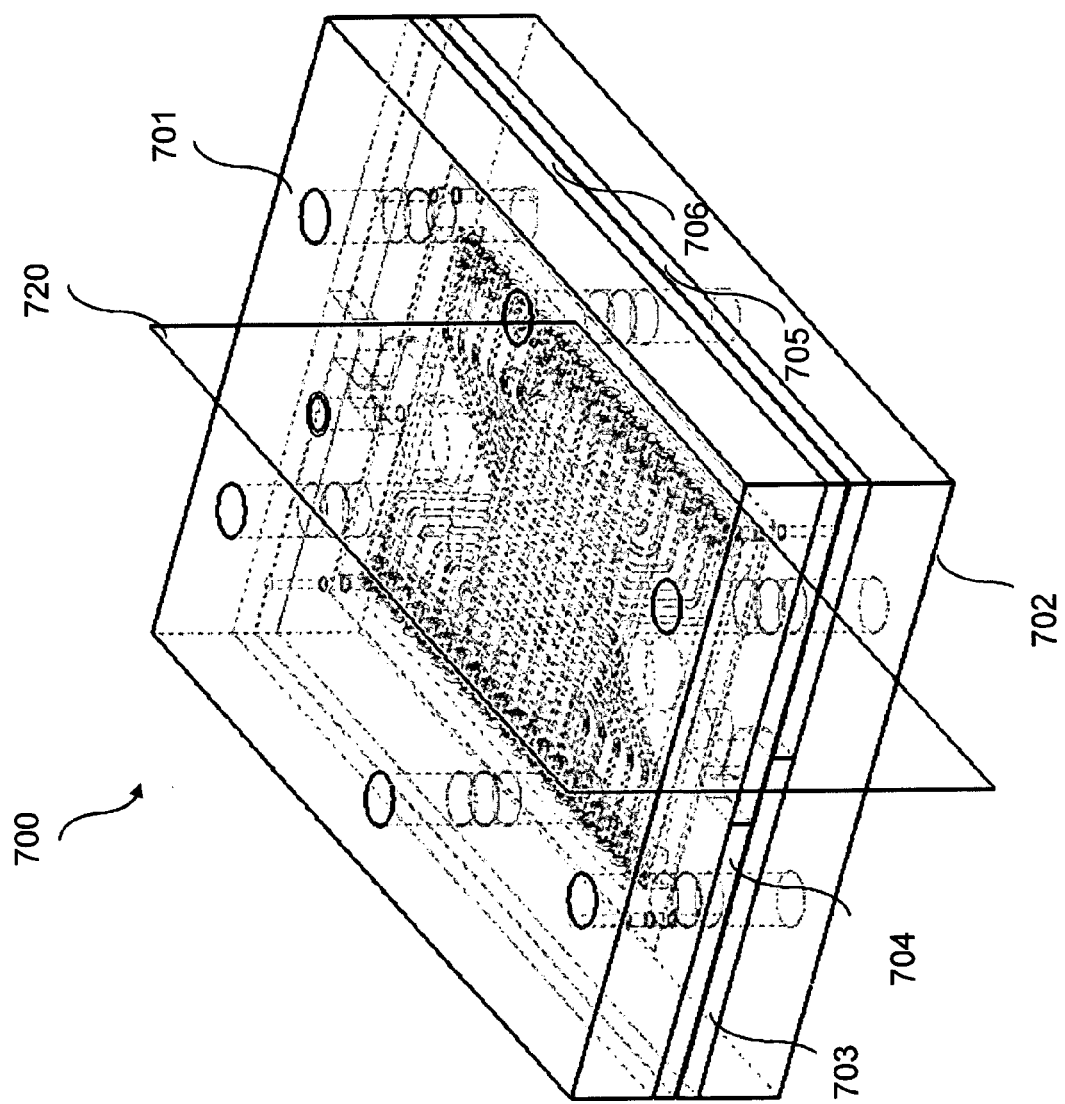
FIG. 21 is a perspective view of an embodiment mold to make the core shown in FIG. 20.
Figure 22:
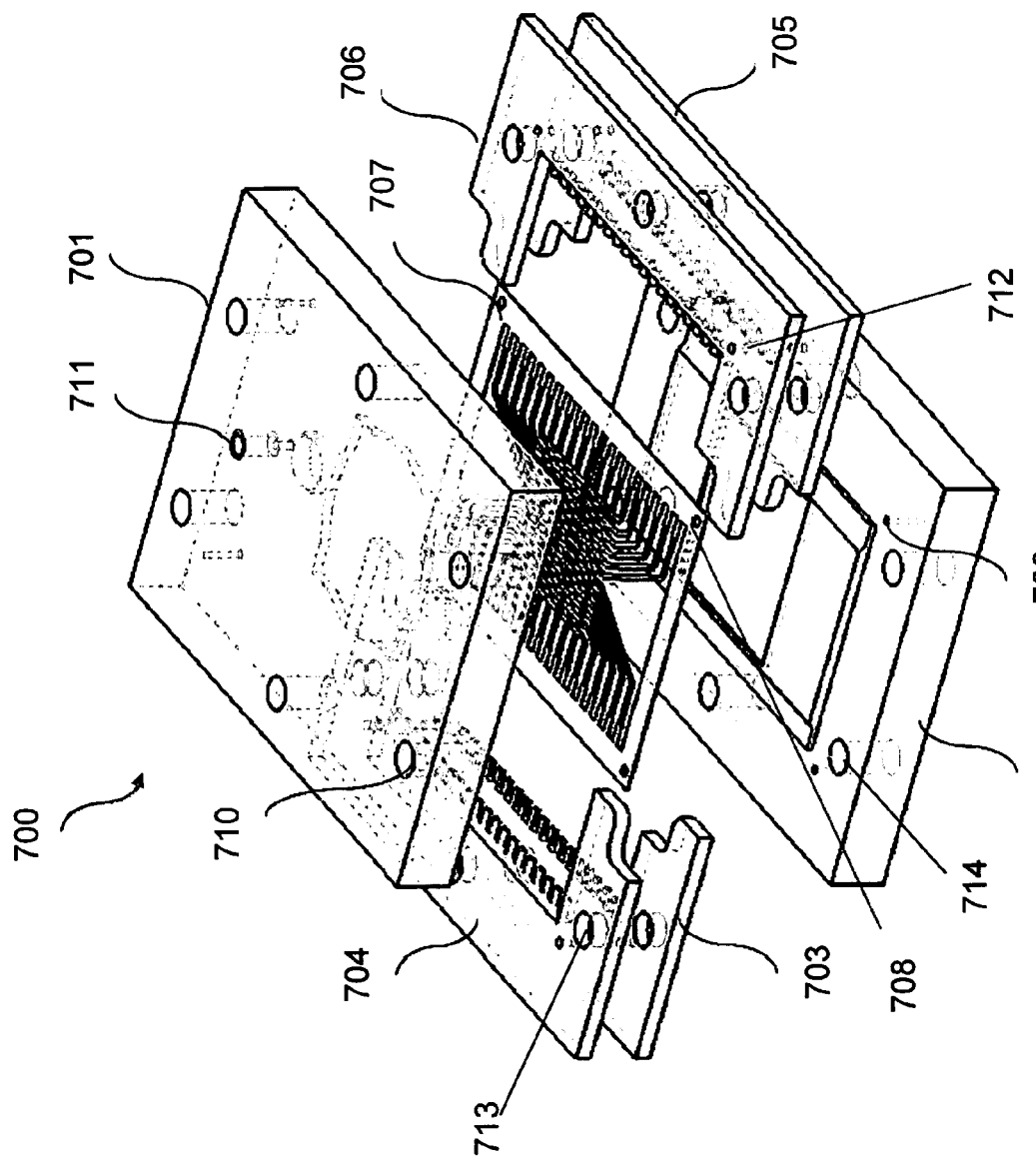
FIG. 22 is an exploded view of the mold shown in FIG. 21.
Figure 23:
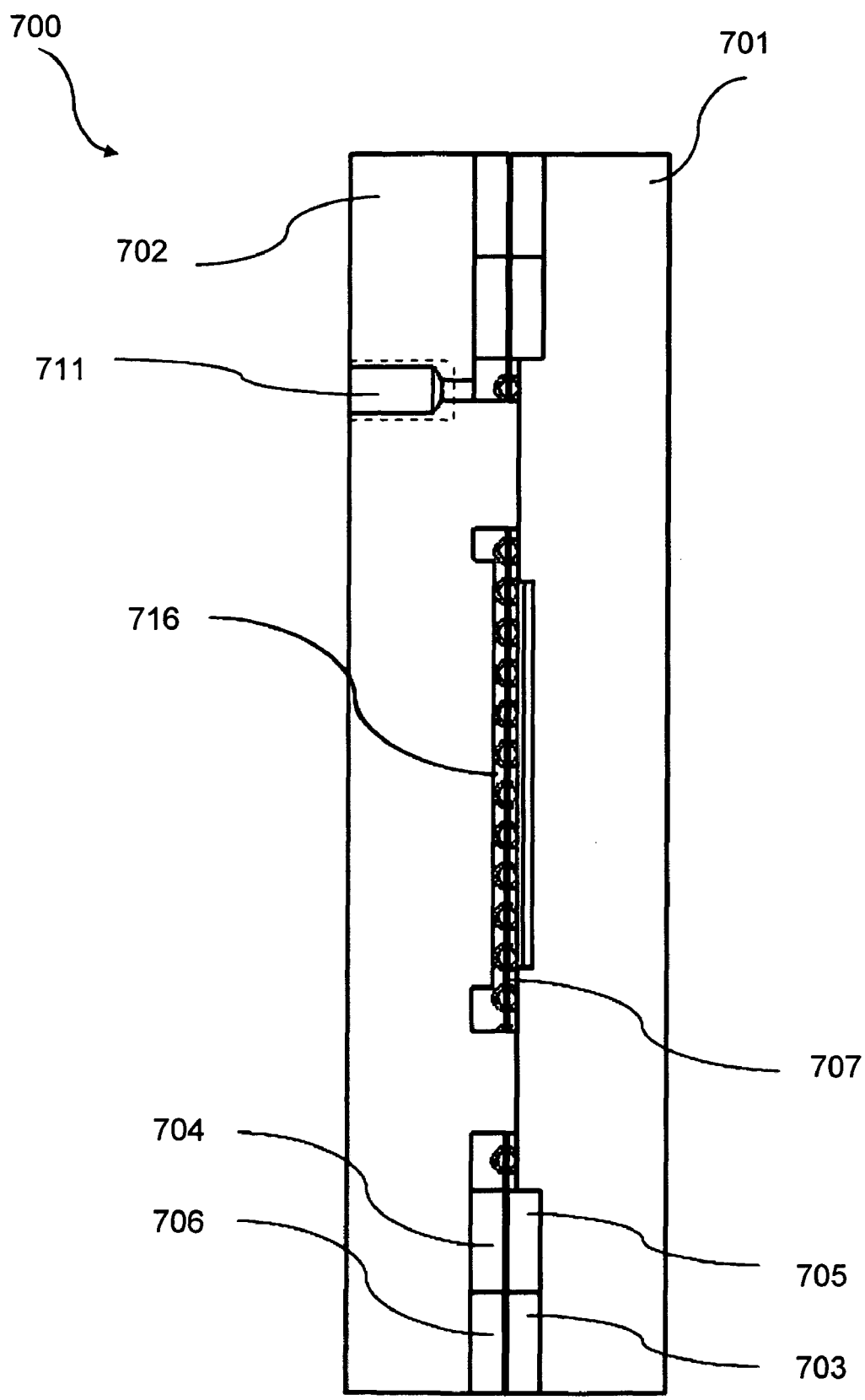
FIG. 23 is a sectional view of the mold shown in FIG. 21.

FIG. 21 is a perspective view of a mold 700 to make the core 601 shown in FIG. 20. FIGS. 22 and 23 are an exploded view of the mold 700 and a sectional view along a plan 720 of the mold 700 indicated in FIG. 21, respectively. The mold 700 includes a top mold 701, a bottom mold 702, four side molds 703, 704, 705 and 706, and a sacrificial mold 707. On the four corners of the sacrificial mold 707 are alignment holes 708 corresponding to holes 709 on the bottom mold 702 and holes 712 on the four side molds 703, 704, 705, and 706. The sacrificial mold 707 is sandwiched between the side molds 703 and 704, and the side molds 705 and 706. Mount holes 710 on the top mold 701, mount holes 713 on the four side molds 703-706, and mount holes 714 on the bottom mold 702 are for screws that hold the various mold components together. When the mold 700 is assembled, a cavity 716 is formed. On the top mold 701 may be provided an injection hole 711 fluidly connected to the cavity 716. PDMS or other elastomeric material maybe injected into the cavity 716 through the injection hole 711. Once the elastomeric material cures in the mold 700, the mold 700 is disassembled. The core 601 with the sacrificial mold 707 embedded in it is thereby formed.

Figure 24:
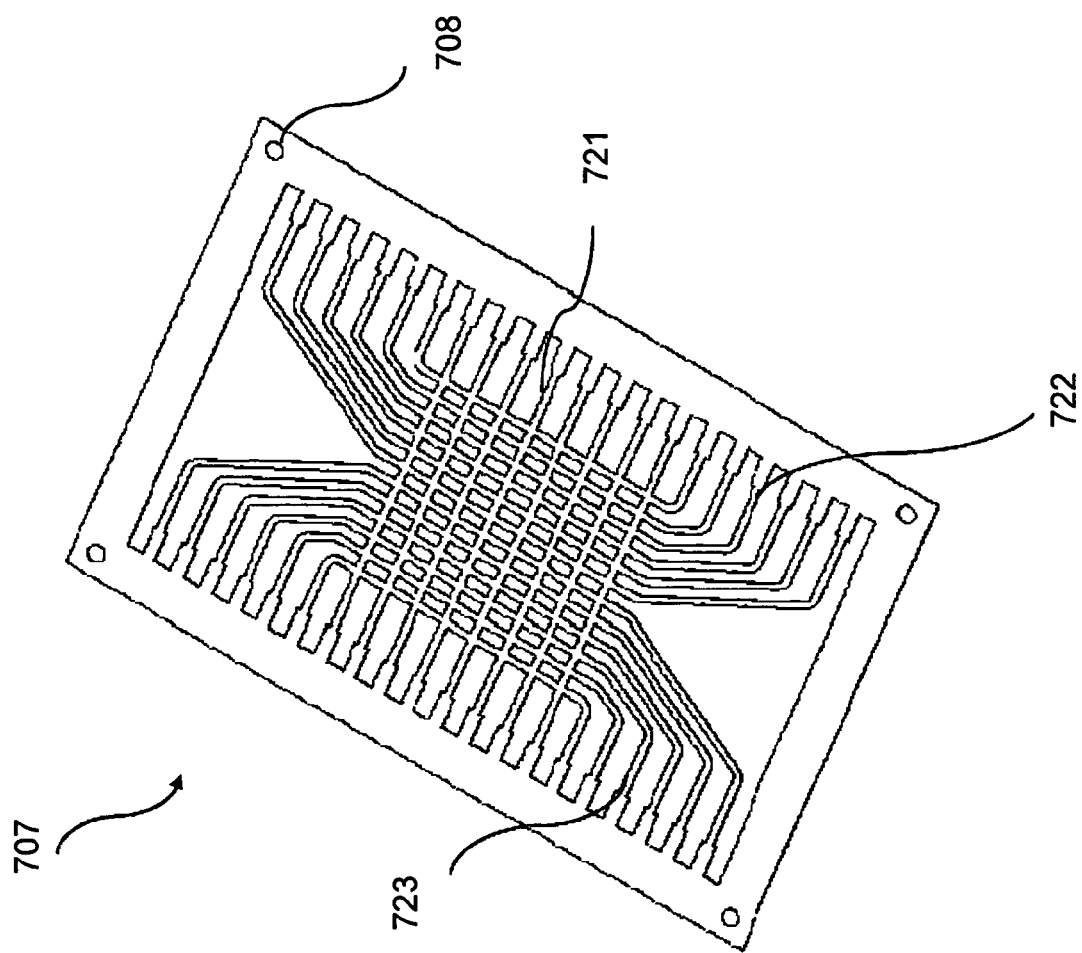
FIG. 24 is a perspective view of an embodiment sacrificial mold component shown in FIG. 21.

FIG. 24 as a perspective view of an embodiment sacrificial mold 707, which may be made from a soluble material, such as gel, starch, or plastics (acrylonitrile-butadiene styrene (ABS) copolymer and Polycarbonate (PC)). In various embodiments, once the core 601 with an embedded sacrificial mold 707 has been made, the core 601 is placed in a solvent, such as hot water. The sacrificial mold 707 dissolves in the solvent. Ultrasonic energy may be applied to clean any residual material of the sacrificial mold 707 from the core 601. Once the sacrificial mold 707 has dissolved away, the channels 604, 608 and 611 in the core 601 are created corresponding to the structures 723, 721, and 722 in the sacrificial mold 707.

Figure 25:
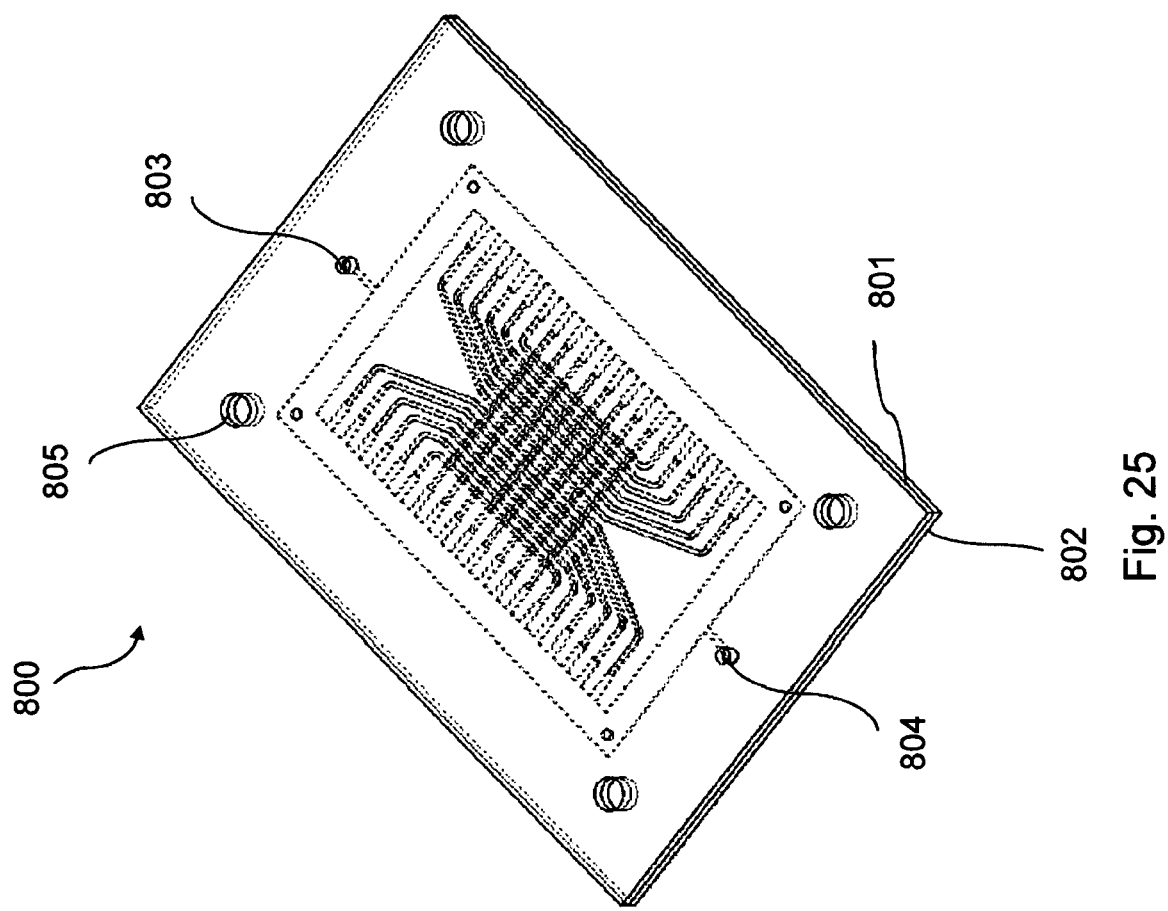
FIG. 25 is a perspective view of an embodiment mold to make a sacrificial mold component.
Figure 26:
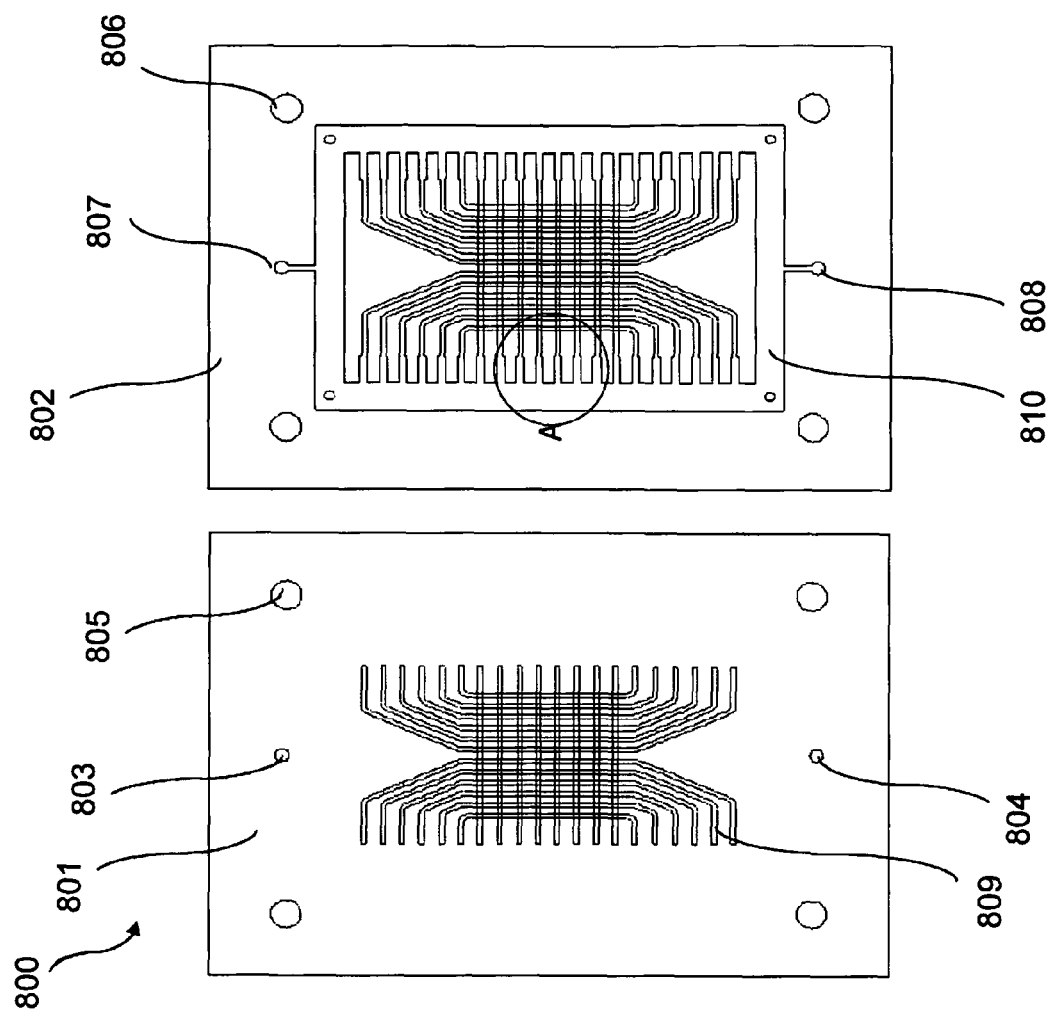
FIG. 26 is an open view of the mold shown in FIG. 25.
Figure 27:
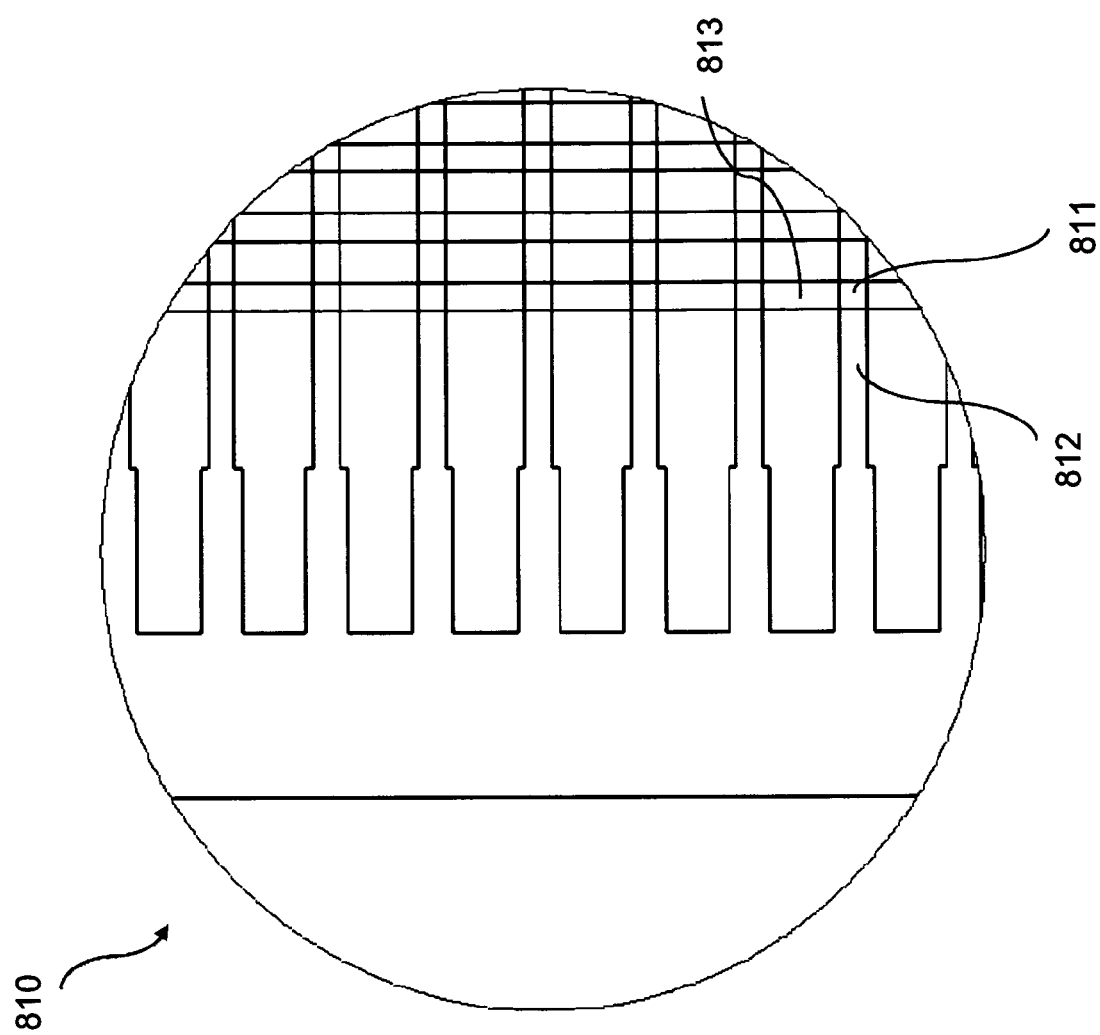
FIG. 27 is a detailed view of a portion of the mold shown in FIG. 25.

FIG. 25 is a perspective view of an embodiment mold 800 to make the embodiment sacrificial mold 707. FIG. 26 is a view of the mold 800 opened with a top mold 801 and a bottom mold 802. FIG. 27 is a detailed view at an area A on the bottom mold 802. On the molds 801 and 802, there are disposed mount holes 805 and 806 at the four respective corners to hold the molds 801, 802 together. Holes 803 and 804 on the top mold 801 with corresponding etched structures 807 and 808 on the bottom mold 802 are used to inject a soluble material into the mold 800.

On the top mold 801 is a surface pattern 809. On the bottom mold 802, there is an etched surface pattern 810. The depth of the etched surface pattern 810 corresponds to the height of the sacrificial mold 707. On the bottom of the etched surface pattern 810 and the surface pattern 809, nanostructures may be created according the various embodiments described above. For example, the surfaces 812 and 813 can be nanoengineered with a surface contact angle of around 150 degrees, while the surface 811 may be engineered to have a surface contact angle of around 100 degrees. These nanostructures on the surfaces of the molds 801 and 802 can then be transferred to the sacrificial mold 707, and subsequently to the core 601 of the fluidic array device 600. Various embodiments of a nanoengineered fluidic array device 600 may thus be created.

The top mold 801 and the bottom mold 802 can be made, for example, from a silicon wafer or substrate. The bottom mold 802 may be etched with the pattern 810 by chemical etching or deep reactive ion etching, for example. The nanostructures on the surface pattern 809 and on the bottom of etched pattern 810 may be created, for example, by E-beam lithography. However, any suitable materials and related forming processes may be used to create the mold 800.

Similarly, any suitable process, including processes other than molding, may be used to make the sacrificial mold 707. In other embodiments for making the sacrificial mold 707, die cutting and nanostructure stamping or hot embossing, for example, may be employed. A die with the pattern 810 can be made by, for example, laser cutting. The surfaces of the patterns 809 and 810 on the dies can be nanoengineered to provide specific nanostructures. When the soluble sheet is cut by the die, the nanostructures may be stamped or embossed into the surfaces of the sheet, thereby transferring the nanostructures on the die to the sacrificial mold 707, and then subsequently to the core 601 in the device 600 as earlier described.

Figure 28:
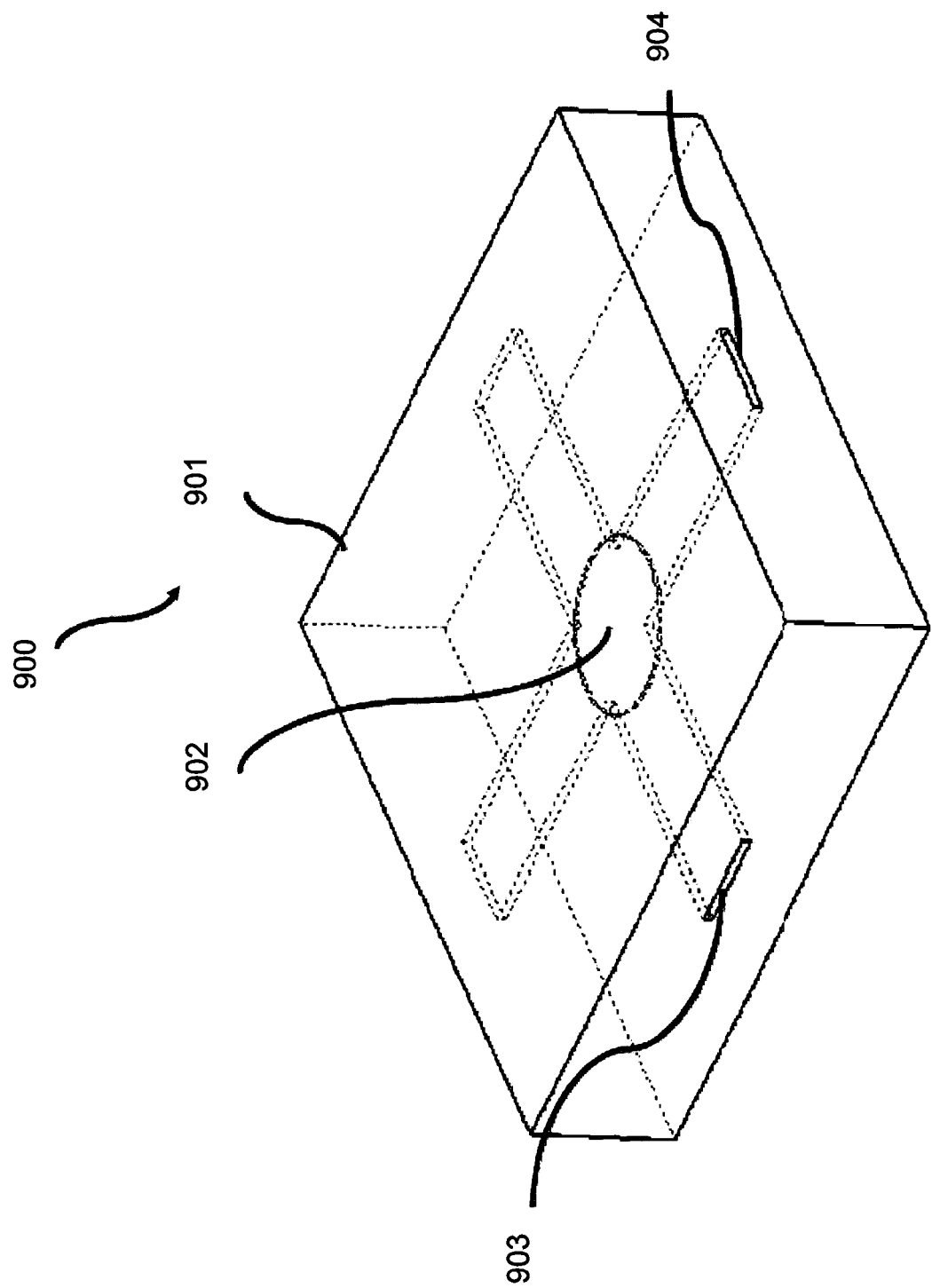
FIG. 28 is a perspective view of an embodiment fluidic array device having an intersection spot of two channels with an embedded disc.
Figure 29:
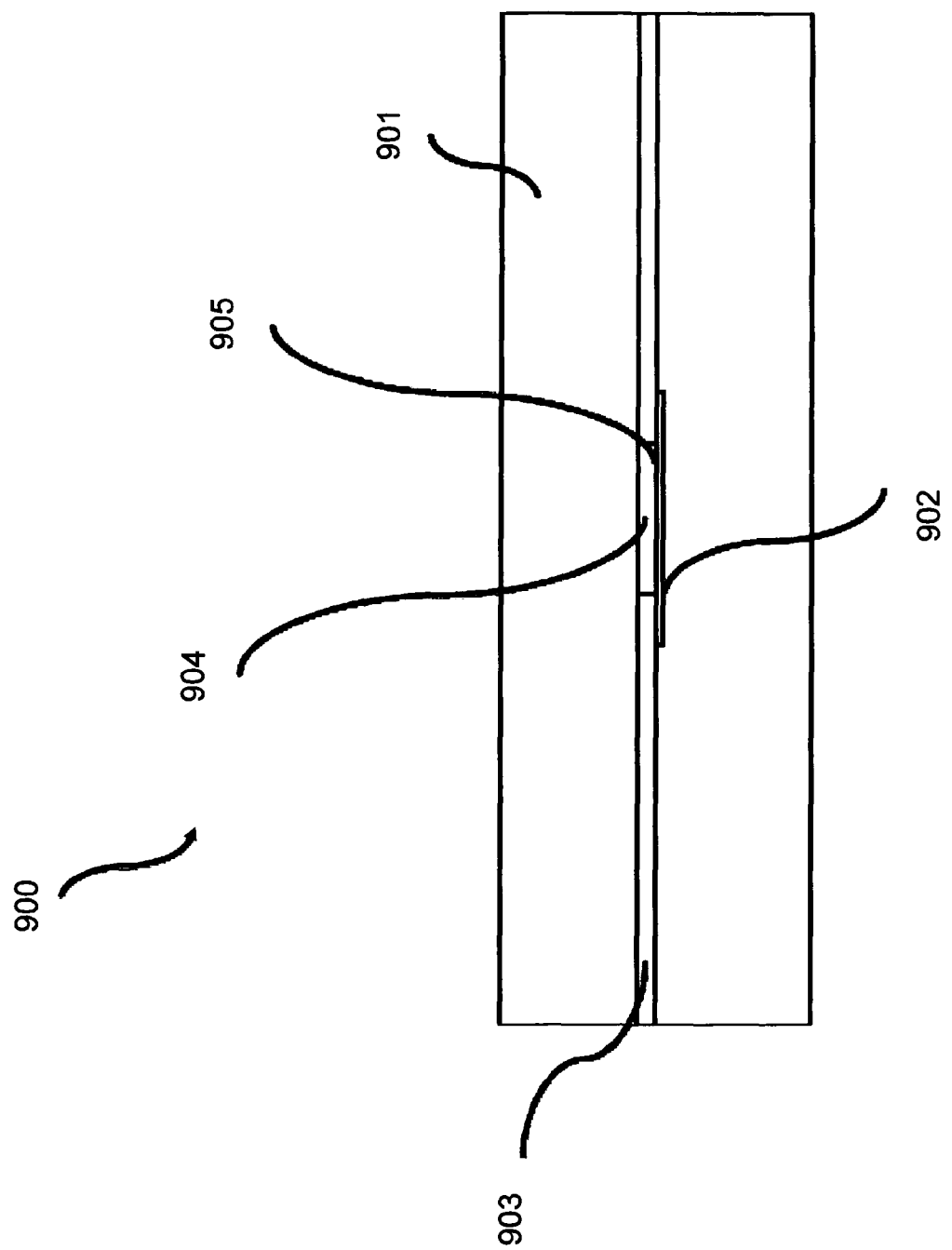
FIG. 29 is a sectional view of the array device shown in FIG. 28 along the center of one channel.

Another embodiment nanoengineered surface for intersection spots is depicted in FIG. 28, which is a perspective view of one intersection spot at an intersection of two channels in a fluidic array device 900. FIG. 29 is a side view of the device 900.

A fluidic array device 900 includes a body 901. Inside the body 901, a fluidic channel 903 and a fluidic channel 904 intersect. At this intersection spot a disc 902 is embedded. The fluidic channels 903 and 904 may be, for example, rectangular with respective aspect ratios from 1:5 to 1:1000. The body 901 may be made of an elastomeric material by, for example, a molding process. The fluidic channels 903 and 904 may be closed, for example, by pinching, at both sides of the intersection.

In specific embodiments, the disc 902 may be slightly larger than the fluidic channels 903, 404. The disk 902 is embedded at the intersection spot of the two fluidic channels 903, 904, with a top surface 905 of the disk 902 forming a portion of the channel bottom surface at the intersection. The disc 903 can be made from a standard silicon substrate, a silicon substrate patterned with a nanoengineered surface, a permanent magnet, a polymer such as polycarbonate or polystyrene, a nylon membrane, gold, or any other suitable sheet material with a thickness, for example, from 1 micron to 1 millimeter.

In other specific embodiments, the disc 902 is made from a silicon wafer patterned with a nanoengineered surface 905. As described in reference to other embodiments, the nanoengineered surface 905 may immobilize DNA, protein, or cells to function as a probe to sense other DNA molecules or proteins in a sample.

As another embodiment, the disc 902 may be made from a magnetic material, such as a permanent magnet or an electromagnet. Magnetic beads with attached probe DNA, probe antigens, or cells are injected into, for example, the channel 903 while the channel 904 is kept closed by pinching the elastomeric body 901 on both sides of the disc 902 along the channel 904. The probe-attached magnetic beads become fixed to the surface 905 of the disc 902 due to magnetic force. By switching the opened and closed states of the fluidic channels 903 and 904, a sample solution may be injected into the channel 904. Biochemical or biological reactions, such as DNA hybridization or protein-specific reactions between the probe-attached magnetic beads and molecules in the sample, will take place. Results may be detected, for example, by laser induced fluorescence detection or electrochemical detection.

Other embodiment devices 600 may include nanostructures at the intersection spots 614, as discussed earlier. As an embodiment to realize, for example, nanoengineered surfaces at spots 614 with functional groups, nanotubes may be processed to be soluble and functionalized with COOH groups. An embodiment process to carboxylate the nanotubes in a microwave oven with a reaction Teflon PFA chamber is presented below:

A: Pristine nanotubes are added into a 1:1 mixture of concentrated $H_2SO_4$ and $HNO_3$ in the reaction chamber.

B: The microwave power is set at 50% of a total of 900 W power. The reaction chamber is then subjected to microwave radiation for 1 minute.

C: The mixture is then diluted in DI water, or any other suitable solvent, and filtered and centrifuged to remove any insoluble materials. The resulting solution may be further dialyzed with DI water or the like until its pH reaches 7.

Using the above procedures, a genuine nanotube solution may be produced, which allows the desirable processability (e.g. water-solubility) and high density of functional groups (—COOH) for the attachment of biomolecules onto the nanotubes. This process may also be applied to other nanomaterials to make other corresponding genuine solutions. Other process may also be applied to make a nanotube solution with different functional groups or without functional groups.

To provide a device 600 with spots 614 having embedded nanotubes, the mold device 700 may be assembled with a sacrificial mold component 707 in which droplets of the functionalized nanotube solution, prepared, for example, by the steps disclosed above, have been deposited or sprayed onto the sacrificial substrate 707 at positions corresponding to the regions where the nanotubes are desired in the device 600. For example, the nanotube solution may be disposed onto the sacrificial mold 707 at regions corresponding to the intersection spots 614. After the droplets dry for 30 minutes, a mixture of a liquid polymer precursor (such as Sylgard® 184 Silicone Elastomer Base) and an associated curing agent may be injected in the mold 700 and left overnight to cure. After the liquid polymer cures, the sacrificial mold component 707 and the cured liquid polymer, such as polydimethylsiloxane (PDMS), are demolded from the side molds 703-706 and the top and bottom molds 701, 702. The sacrificial mold component 707 is then dissolved in a solvent, such as water and a slightly acidic solution. The nanotubes are entrapped in the cured liquid polymer at the desired locations, such as at the intersection spots 614. If the spots 614 include columnar structures, then the nanotubes may be embedded on the surfaces of the columnar structures as well. The nanotube solution with or without functional groups may be disposed onto the other regions of the sacrificial mold 707 to modify the surface properties corresponding to the corresponding fluidic structures in the device 600.

In other embodiments, a fluidic device 600 with intersection spots 614 having embedded nanotubes or other nanostructures may be created using the methods discussed with reference to FIGS. 28 and 29. That is, nanotubes or other nanostructures may be formed on a substrate 902, which may subsequently be disposed within the device 600 at the intersection spot 614 by a molding process. For example, the substrates 902 may be attached at positions corresponding to the intersection spots 614 onto the sacrificial mold component 707 when assembling the mold 700. After the liquid polymer is injected into the mold 700 and cures, and the sacrificial mold component 707 is then dissolved, the substrates 902 remain disposed in the device 600. The nanoengineered surface on the substrate 902 provides a nanoengineered surface at the intersection spot 614.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A stage for a fluidic device, the stage comprising:
    a top surface for accepting a bottom surface of the fluidic device;
    fluidic pins coupled to the top surface for mechanically and fluidly engaging with corresponding fluidic interfaces on the fluidic device, each fluidic pin comprising a fluidic pathway therethrough to establish a fluidic connection between the stage and the fluidic device;
    a ridge for pressing against the bottom surface of the fluidic device at a position corresponding to a fluidic channel in the fluidic device to fluidically pinch or block the fluidic channel; and
    a clamping system for holding the bottom surface of the fluidic device against the top surface of the stage.

2. The stage of claim 1 further comprising an actuator means for selectively causing the ridge to press against the bottom surface of the fluidic device.

3. The stage of claim 1 wherein a height of the ridge above the top surface is adapted to pinch or block the fluidic channel in the fluidic device.

4. The stage of claim 1 further comprising an aligning means for aligning the fluidic device on the stage.

5. The stage of claim 4 wherein the aligning means comprises framing corners adapted to mate with corresponding corners of the fluidic device.

6. The stage of claim 4 wherein the aligning means comprises protrusions or depressions corresponding to respective depressions or protrusions on the fluidic device.

* * * * *